(12) United States Patent
Uberuaga et al.

(10) Patent No.: US 11,341,805 B2
(45) Date of Patent: *May 24, 2022

(54) FEATURE SYMBOL FRAME MECHANIC FOR RANDOM BASED GAME OUTCOMES

(71) Applicant: Aristocrat Technologies, Inc., Las Vegas, NV (US)

(72) Inventors: Christmas Uberuaga, Reno, NV (US); Scott Delekta, Las Vegas, NV (US); Allon Englman, Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/948,607

(22) Filed: Sep. 24, 2020

(65) Prior Publication Data
US 2022/0092918 A1 Mar. 24, 2022

(51) Int. Cl.
*A63F 9/24* (2006.01)
*G07F 17/32* (2006.01)
*G06F 7/58* (2006.01)

(52) U.S. Cl.
CPC .......... *G07F 17/3213* (2013.01); *G06F 7/588* (2013.01); *G07F 17/3267* (2013.01)

(58) Field of Classification Search
CPC .. G07F 17/34; G07F 17/3244; G07F 17/3267; G07F 17/3258; G07F 17/3213; G07F 17/323; G07F 17/3255; G06F 7/588
See application file for complete search history.

(56) References Cited

U.S. PATENT DOCUMENTS 5,833,537 A * 11/1998 Barrie ................. G07F 17/3265
463/21
5,935,002 A 8/1999 Falciglia
(Continued)

FOREIGN PATENT DOCUMENTS

AU 2019204175 2/2020

OTHER PUBLICATIONS

Aristocrat, Welcome to Fantastic Jackpots—Fantastic Cash, https://www.aristocrat.com/anz/games/welcome-to-fantastic-jackpots-fantastic-cash/, Aug. 2018.
(Continued)

*Primary Examiner* — Justin L Myhr
(74) *Attorney, Agent, or Firm* — Weaver Austin Villeneuve & Sampson LLP

(57) ABSTRACT

A symbol frame mechanic for a gaming device is described. The symbol frame mechanic generates a random based game outcome in a game instance of a base game that triggers a supplemental game feature. The random based game outcome includes a plurality of target feature symbols. The symbol frame mechanic generates a plurality of feature symbol frames at symbol window positions with the target feature symbols. The target feature symbols trigger generation of the feature symbol frames. The symbol frame mechanic determines a current symbol frame state according to the feature symbol frames and generate a random based game outcome in a game instance of the supplemental game feature. The symbol frame mechanic updates the current symbol frame state based on combining the random based game outcome in the game instance of the supplemental game feature with the current symbol frame state.

19 Claims, 16 Drawing Sheets

(56) References Cited

U.S. PATENT DOCUMENTS

| | | | |
|---|---|---|---|
| 7,237,775 B2 | 7/2007 | Thomas | |
| 7,445,547 B2 | 11/2008 | Suzuki | |
| 7,780,519 B2 | 8/2010 | Gomez | |
| 8,172,665 B2 | 5/2012 | Hoffman | |
| 8,226,468 B2 | 7/2012 | Hoffman | |
| 8,371,928 B2 | 2/2013 | Englman | |
| 8,388,438 B2 | 3/2013 | Englman | |
| 8,460,092 B1 | 6/2013 | Slomiany | |
| 8,591,308 B2 | 11/2013 | Hoffman | |
| 9,135,785 B2 | 9/2015 | Hoffman | |
| 9,449,470 B2 | 9/2016 | Baerlocher | |
| 9,530,287 B2 | 12/2016 | Hoffman | |
| 9,564,006 B2 | 2/2017 | Ryan | |
| 9,640,025 B2 | 5/2017 | Saunders | |
| 9,691,231 B2 | 6/2017 | Fujisawa | |
| 9,824,527 B2 | 11/2017 | Evans | |
| 9,836,915 B2 | 12/2017 | Meyer | |
| 9,940,775 B2 | 4/2018 | Eaton | |
| 10,152,845 B2 | 12/2018 | Pawloski | |
| 10,388,112 B2 | 8/2019 | You | |
| 10,403,093 B1 | 9/2019 | Halvorson | |
| 10,410,477 B2 | 9/2019 | Hoffman | |
| 2003/0022712 A1* | 1/2003 | Locke | G07F 17/3211 463/20 |
| 2003/0092487 A1 | 5/2003 | Meyer | |
| 2004/0033827 A1 | 2/2004 | Gilmore | |
| 2004/0048646 A1* | 3/2004 | Visocnik | G07F 17/32 463/16 |
| 2005/0059459 A1 | 3/2005 | Dunn | |
| 2007/0238510 A1 | 10/2007 | Halprin | |
| 2008/0242404 A1 | 10/2008 | Aoki | |
| 2009/0325681 A1 | 12/2009 | Englman | |
| 2010/0298041 A1 | 11/2010 | Berman | |
| 2012/0202570 A1 | 8/2012 | Schwartz | |
| 2015/0018070 A1 | 1/2015 | Meyer | |
| 2015/0024826 A1 | 1/2015 | Ghaly | |
| 2015/0087382 A1* | 3/2015 | Gilbertson | G07F 17/326 463/20 |
| 2015/0087385 A1* | 3/2015 | Shiraishi | G07F 17/34 463/20 |
| 2015/0094132 A1* | 4/2015 | Elias | G07F 17/3213 463/20 |
| 2015/0213672 A1 | 7/2015 | Elias | |
| 2016/0203670 A1 | 7/2016 | Ford | |
| 2018/0025585 A1 | 1/2018 | Schmidt | |
| 2018/0130286 A1* | 5/2018 | Berman | G07F 17/3244 |
| 2019/0287336 A1* | 9/2019 | Prabhu | G07F 17/3262 |
| 2019/0304255 A1 | 10/2019 | San | |
| 2020/0051373 A1 | 2/2020 | Meyer | |

OTHER PUBLICATIONS

Notice of Allowance dated Apr. 5, 2021 for U.S. Appl. No. 16/538,623 (pp. 1-9).

Notice of Allowance dated Aug. 31, 2021 for U.S. Appl. No. 16/948,606 (pp. 1-9).

Notice of Allowance dated Oct. 27, 2021 for U.S. Appl. No. 16/948,606 (pp. 1-8).

* cited by examiner

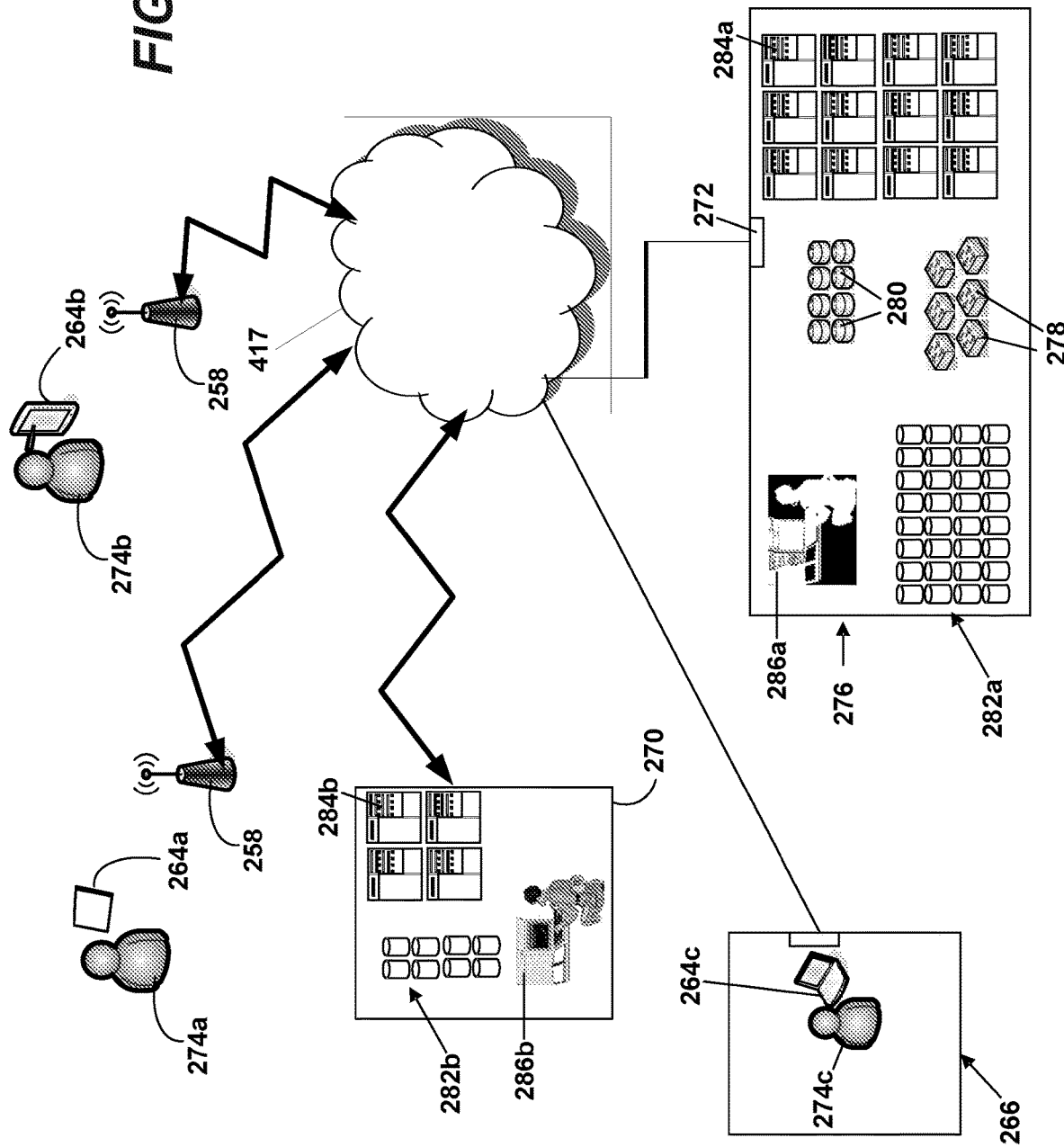

FEATURE SYMBOL FRAME MECHANIC FOR RANDOM BASED GAME OUTCOMES

RELATED APPLICATION(S)

The present application is related to co-filed U.S. patent application Ser. No. 16/948,606, entitled "Symbol Frame Mechanics for Random Based Game Outcomes," filed on Sep. 24, 2020, which is hereby incorporated herein by reference in its entirety and for all purposes. The present application is related to U.S. patent application Ser. No. 16/827,919, entitled "Electronic Gaming System with Multiple Awardable Marker Mechanics," filed on Mar. 24, 2020, which claims priority to Australian Patent Application No. 2019236736, filed Sep. 27, 2019, entitled "A Gaming System," and Australian Patent Application No. 2019901678, filed May 17, 2019, entitled "A Gaming System," all of which are also hereby incorporated by reference herein in their entireties and for all purposes.

BACKGROUND

The disclosure relates generally to the field of user interface (UI) design, electronic gaming devices, and electronic gaming software. More particularly, but not by way of limitation, this disclosure relates to performing gaming device operations that present and implement one or more symbol frame mechanics for random based game outcomes.

Electronic gaming machines (EGMs) or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of a game instance (or single play) of a primary or base game. In some cases, a player may qualify for a special mode of the base game, a secondary game feature, or a bonus game feature of the base game by attaining a certain winning combination or triggering event in, or related to, the base game, or after the player is randomly awarded the special mode, secondary game feature, or bonus game feature. In the special mode, secondary game feature, or bonus game feature, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary game features, and/or the amount awarded.

Typical games use a random number generator (RNG) to randomly determine the outcomes (also referenced throughout the disclosure as a "random based game outcome") for the games. Examples of random based game outcomes include slots, video poker, video blackjack, video pachinko, keno, bingo, and lottery outcomes. The games are also designed to return a certain percentage of the amount wagered back to the player over the course of many rounds of play or game instances, which is generally referred to as return to player (RTP) for a game. The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

EGMs often depend on usability (e.g., ease of use and player understandability) and new or improved game features to enhance player experiences on the EGMs. Although previous EGMs include various UI features, game features, and backend game processing operations associated with the UI features to improve usability and enhance player experiences, there is a continuous need for further improvement to EGMs and other electronic gaming devices, electronic gaming software, and/or UI design.

SUMMARY

In one implementation, a system comprises memory and a processor operable to interact with the memory. The processor generates, based on a random number generator, a random based game outcome in a game instance of a base game that triggers a supplemental game feature. The random based game outcome includes a plurality of target feature symbols. The processor generates a plurality of feature symbol frames at symbol window positions with the target feature symbols. The target feature symbols trigger generation of the feature symbol frames. The processor determines a current symbol frame state according to the feature symbol frames and generate, based on the random number generator, a random based game outcome in a game instance of the supplemental game feature. The processor combines the random based game outcome in the game instance of the supplemental game feature with the current symbol frame state and updates the current symbol frame state based on combining the random based game outcome in the game instance of the supplemental game feature with the current symbol frame state.

In another implementation, a system comprises memory and a processor operable to interact with the memory. The processor presents, based on a random number generator, a random based game outcome in a game instance of a base game that triggers a supplemental game feature. The random based game outcome includes a plurality of target feature symbols. The processor presents a plurality of feature symbol frames at symbol window positions with the target feature symbols. The target feature symbols trigger generation of the feature symbol frames. The processor presents feature symbol frames according to a current symbol frame state and presents, based on the random number generator, a random based game outcome in a game instance of the supplemental game feature. The processor presents the addition of one or more feature symbol frames based on updating the current symbol frame state with the random based game outcome in the game instance of the supplemental game feature.

In another implementation, a method is described to implement a symbol frame mechanic. The method generates, based on a random number generator, a random based game outcome in a game instance of a base game that triggers a supplemental game feature. The random based game outcome includes a plurality of target feature symbols. The method generates a plurality of feature symbol frames at symbol window positions with the target feature symbols. The target feature symbols trigger generation of the feature symbol frames. The method determines a current symbol frame state according to the feature symbol frames and generate, based on the random number generator, a random based game outcome in a game instance of the supplemental game feature. The method combines the random based game outcome in the game instance of the supplemental game feature with the current symbol frame state and updates the current symbol frame state based on combining the random based game outcome in the game instance of the supplemental game feature with the current symbol frame state.

In another implementation, a method is described to implement a symbol frame mechanic. The method presents, based on a random number generator, a random based game outcome in a game instance of a base game that triggers a supplemental game feature. The random based game outcome includes a plurality of target feature symbols. The method presents a plurality of feature symbol frames at symbol window positions with the target feature symbols. The target feature symbols trigger generation of the feature symbol frames. The method presents feature symbol frames according to a current symbol frame state and presents, based on the random number generator, a random based game outcome in a game instance of the supplemental game feature. The method presents the addition of one or more feature symbol frames based on updating the current symbol frame state with the random based game outcome in the game instance of the supplemental game feature.

In another implementation, a system comprises memory and a processor operable to interact with the memory. The processor generates, based on a random number generator, a random based game outcome in a first game instance, where the random based game outcome in the first game instance includes a special symbol. The processor determines that the special symbol lands within a symbol window position with a preexisting symbol frame and generates an upgraded symbol frame at the symbol window position. The special symbol triggers upgrading the preexisting symbol frame. The processor resets a count indicative of a number of remaining spins left before the preexisting symbol frame expires to a designated number of remaining spins based on generating the upgraded symbol frame and generate, based on the random number generator, a random based game outcome in a second game instance. The random based game outcome in the second game instance includes a credit symbol. The processor determines that the credit symbol lands within the symbol window position with the upgraded symbol frame and triggers a payout for the credit symbol that lands in the upgraded symbol frame based on a credit value for the credit symbol.

In another implementation, a system comprises memory and a processor operable to interact with the memory. The processor presents, based on a random number generator, a random based game outcome in a first game instance, where the random based game outcome in the first game instance includes a special symbol. The processor presents that the special symbol lands within a symbol window position with a preexisting symbol frame and presents an upgraded symbol frame at the symbol window position. The special symbol triggers upgrading the preexisting symbol frame. The processor presents a reset on a count indicative of a number of remaining spins left before the preexisting symbol frame expires to a designated number of remaining spins based on generating the upgraded symbol frame. The processor presents, based on the random number generator, a random based game outcome in a second game instance. The random based game outcome in the second game instance includes a credit symbol. The processor presents that the credit symbol lands within the symbol window position with the upgraded symbol frame and triggering an animation payout for the credit symbol that lands in the upgraded symbol frame based on a credit value for the credit symbol.

In another implementation, a method is described to implement a symbol frame mechanic. The method generates, based on a random number generator, a random based game outcome in a first game instance, where the random based game outcome in the first game instance includes a special symbol. The method determines that the special symbol lands within a symbol window position with a preexisting symbol frame and generates an upgraded symbol frame at the symbol window position. The special symbol triggers upgrading the preexisting symbol frame. The method resets a count indicative of a number of remaining spins left before the preexisting symbol frame expires to a designated number of remaining spins based on generating the upgraded symbol frame and generate, based on the random number generator, a random based game outcome in a second game instance. The random based game outcome in the second game instance includes a credit symbol. The method determines that the credit symbol lands within the symbol window position with the upgraded symbol frame and triggers a payout for the credit symbol that lands in the upgraded symbol frame based on a credit value for the credit symbol.

In another implementation, a method is described to implement a symbol frame mechanic. The method presents, based on a random number generator, a random based game outcome in a first game instance, where the random based game outcome in the first game instance includes a special symbol. The method presents that the special symbol lands within a symbol window position with a preexisting symbol frame and presents an upgraded symbol frame at the symbol window position. The special symbol triggers upgrading the preexisting symbol frame. The method presents a reset on a count indicative of a number of remaining spins left before the preexisting symbol frame expires to a designated number of remaining spins based on generating the upgraded symbol frame. The method presents, based on the random number generator, a random based game outcome in a second game instance. The random based game outcome in the second game instance includes a credit symbol. The processor presents that the credit symbol lands within the symbol window position with the upgraded symbol frame and triggering an animation payout for the credit symbol that lands in the upgraded symbol frame based on a credit value for the credit symbol.

In one or more implementations, each of the above described methods, and variations thereof, may be implemented as a series of computer executable instructions executed on a programmable electronic device. Such instructions may use any one or more convenient programming language. Such instructions may be collected into engines and/or programs and stored in any computer-readable medium or media that is readable and executable by a computer system, gaming device, or other programmable electronic device.

BRIEF DESCRIPTION OF THE DRAWINGS

While certain implementations will be described in connection with the illustrative implementations shown herein, this disclosure is not limited to those implementations. On the contrary, all alternatives, modifications, and equivalents are included within the spirting and scope of the invention as defined by the claims. In the drawings, which are not to scale, the same reference numerals are used throughout the description and in the drawing figures for components and elements having the same structure. If applicable, primed reference numerals are used for components and elements having similar function and construction to those components and elements having the same unprimed reference numerals.

FIG. 2C is a diagram that shows examples of components of a system for providing online gaming according to some aspects of the present disclosure.

DETAILED DESCRIPTION

Figure 1:
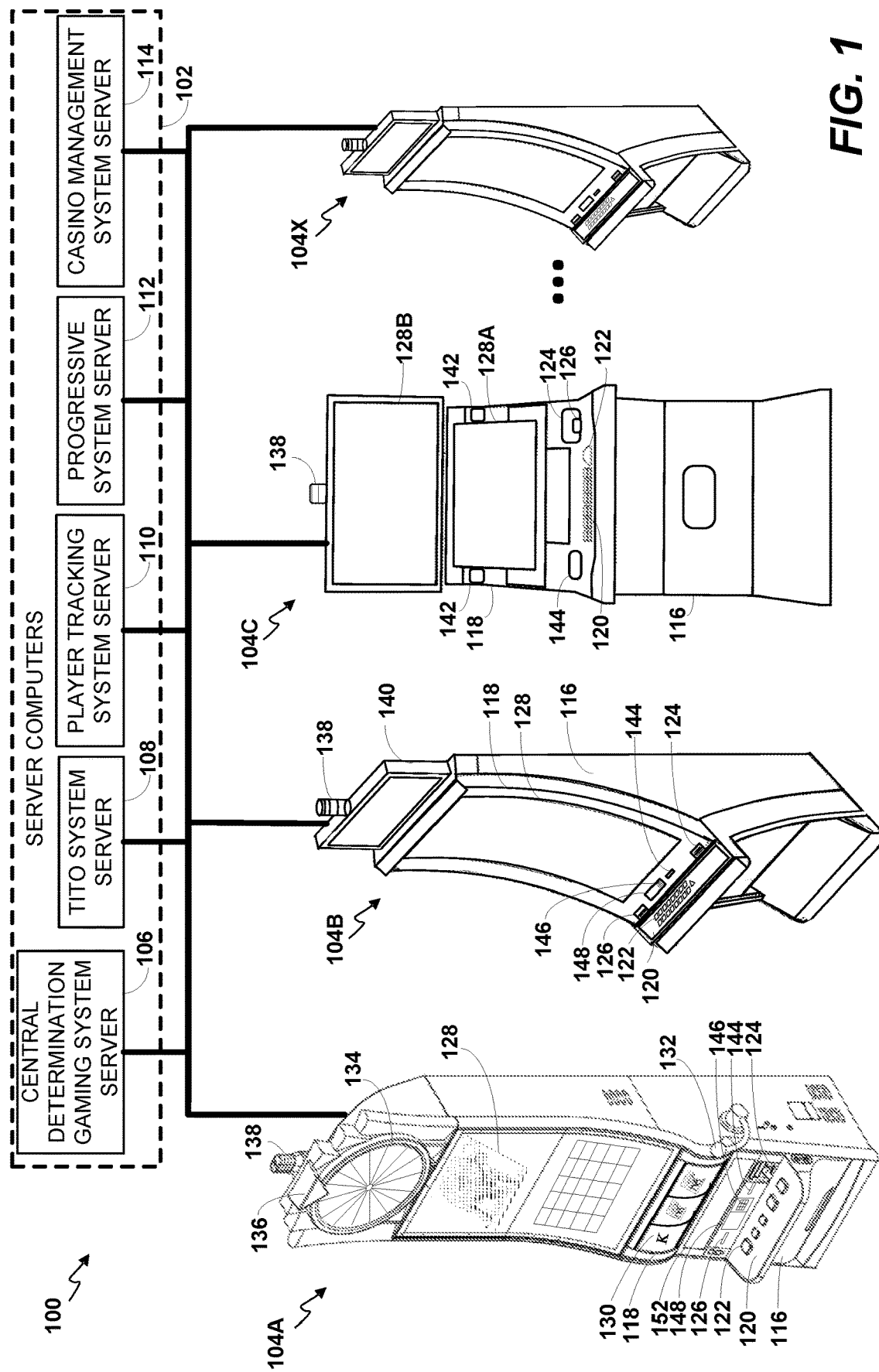
FIG. 1 is an exemplary diagram showing several EGMs networked with various gaming related servers.

The disclosure includes various example implementations that generate random based game outcomes according to one or more symbol frame mechanics. In one or more implementations, a gaming device provides a symbol frame mechanic within a base game. During the base game, the gaming device generates and presents a random based game outcome that includes one or more special symbols. When the special symbols land on one or more symbol window positions in a reel grid, the special symbols trigger the creation of symbol frames for those corresponding symbol window positions. The gaming device also presents a spin indicator for the symbol frame to indicate the number of remaining spins (e.g., three spins) before the symbol frame expires and disappears. In a subsequent spin, if a special symbol lands within an unexpired symbol frame, the gaming device resets the spin indicator for the symbol frame back to a designated number of spins (e.g., three spins). Additionally, or alternatively, the gaming device can upgrade the symbol frame to a different stage that assigns a multiplier value (e.g., ×2, ×3, and ×5) to the symbol frame when another special symbol lands within an unexpired symbol frame. When a credit symbol lands in an unexpired symbol frame that does not have an assigned multiplier value, the gaming device triggers a payout of the credit value for the credit symbol. If the symbol frame has an assigned multiplier value, the gaming device triggers a payout based on multiplying the credit value for the credit symbol that lands in the unexpired symbol frame with the assigned multiplier value. After the spin indicator reaches zero for a symbol frame, the symbol frame expires and is removed from the reel grid at the corresponding symbol window position.

The gaming device can also utilize the same symbol frame mechanic in one or more supplemental game features (e.g., a special mode, secondary game, or bonus game). In one or more implementations, during the base game, the gaming device randomly triggers one or more supplemental game features, where the random trigger is independent of the random based game outcomes generated in the base game. The supplement game feature can be part of a tiered, set of supplemental game features configured to increase the number of symbol frames created in the base game. For example, the supplemental game feature could be a single spin that lands numerous special symbols to create and/or upgrade symbol frames on the reel grid that persists after exiting supplemental game feature. In another example, the supplemental game feature could include multiple spins that generate numerous special symbols to create and/or upgrade existing symbol frames on the reel grid. After the supplemental game feature finishes, the gaming device returns to the base game with the new and/or upgraded symbol frames. The new and/or upgraded symbol frames that persist could trigger payout of credit symbols that land on subsequent spins in the base game.

The gaming device can vary the volatility and/or average payout amongst the tiered, set of supplemental game features. To vary the volatility and/or average payout, the gaming device tiers the supplemental game features based on a random boost mechanic that upgrades the credit values for one or more credit symbols. For example, a starting tier, supplemental game feature can be set as a standard feature that applies no boost operation to credit values for the credit symbols. A second tier, supplemental game feature can be a super or deluxe feature that randomly applies a single boost operation to each credit symbol in a set of reels. A third tier, supplemental game feature can be a mega or ultra feature that randomly applies two boost operations to each credit symbol in the set of reels. By doing so, the third tier, supplemental game feature would, on average, award the highest payout; the second tier, supplemental game feature would, on average, award a lower payout; and the starting tier, supplemental game feature would, on average, award the lowest payout.

Additionally, or alternatively, a gaming device can apply another symbol frame mechanic to a supplemental game feature that is triggered based on a random based game outcome generated in a base game. For example, the gaming device generates and presents a random based game outcome that satisfies a trigger condition, such as landing on six or more target feature symbols (e.g., scatter symbols) in a reel grid. After triggering the supplemental game feature, the gaming device creates feature symbol frames at symbol window positions where the target feature symbols landed in the base game. During the supplemental game feature, the feature symbol frames do not expire and remain until the supplement game feature ends. For a given spin, if a target feature symbol lands in a symbol window position without a feature symbol frame, the target feature symbol triggers the creation of a feature symbol frame at the corresponding symbol window position. If a target feature symbol lands within a feature symbol frame, the gaming device upgrades the feature symbol frame to a different stage by assigning a multiplier value (e.g., ×2 and ×5) to the symbol frame. At the last spin of the supplemental game feature, the reels transform to include some or all credit symbols. When a credit symbol lands in a feature symbol frame without an assigned multiplier value, the gaming device triggers a payout based on the credit value for the credit symbol. If the feature symbol frame has been upgraded to another stage associated with a multiplier value, the gaming device triggers a payout based on multiplying the credit value for the credit symbol that lands in the feature symbol frame with the associated multiplier value. During the supplemental game feature, the gaming device could present another type of target feature symbol (generally reference in this disclosure as a "dynamic target feature symbol") that not only triggers the creation of a symbol frame, but also dynamically transforms the special symbol into another symbol type, such as a re-spin symbol (e.g., +1 spin symbol) and/or a jackpot prize symbol.

In terms of technical effects, the symbol frame mechanics described throughout the disclosure delivers improvements to electronic gaming software, UI design, and/or gaming devices by providing new and/or improved gaming device operations that comply with gaming regulations. Specifically, a gaming device is specially programmed to present and implement symbol frame mechanics that improve the usability of the gaming devices, enhance a player's understandability of obtaining certain game outcomes, provide another approach to presenting how a gaming device builds equity in a game, and implement new and/or improved gaming device operations that comply with gaming regulations. For example, the use of symbol frames and/or feature symbol frames provides a persistence operation that triggers payout of credit symbols that land during multiple subsequent spins. Each time a credit symbol lands in a symbol frame or feature symbol frame in a subsequent spin, the gaming device pays out the credit value for the credit symbol. By having the symbol frames or feature symbol frames persist over multiple subsequent spins, the gaming device can generate random based game outcomes that build game equity over the course of multiple spins. In contrast, other implementations that randomly trigger payout of credit symbols, such as landing a certain number of credit symbols or landing a specific trigger symbol, do not persist and are unable to accrue over spins. As an example, when a given spin lands a specific trigger symbol that triggers a payout operation for credit symbols, the specific trigger symbol is not held for or persists to a next spin to potentially trigger another payout operation. These and other technical features are described in greater detail later in the disclosure.

Example Electronic Gaming Devices and Gaming Environments

FIG. 1 illustrates several different models of EGMs that could be specially configured to generate random based game outcomes using one or more symbol frame mechanic. As shown in FIG. 1, the EGMs, which are more generally referred to as gaming devices 104A-104X, may be networked to various gaming related servers. Shown is a system 100 in a gaming environment including one or more server computers 102 (e.g., slot servers of a casino) that are in communication, via a communications network, with one or more gaming devices 104A-104X (e.g., EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless TITO system). In such cashless implementations, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game feature. Bonus topper wheel 134 is typically used to play a bonus game feature, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.01 or $0.05), paylines, pay tables, and/or various game related graphics. In some implementations, the information panel(s) 152 may be implemented as an additional video display.

Figure 2A:
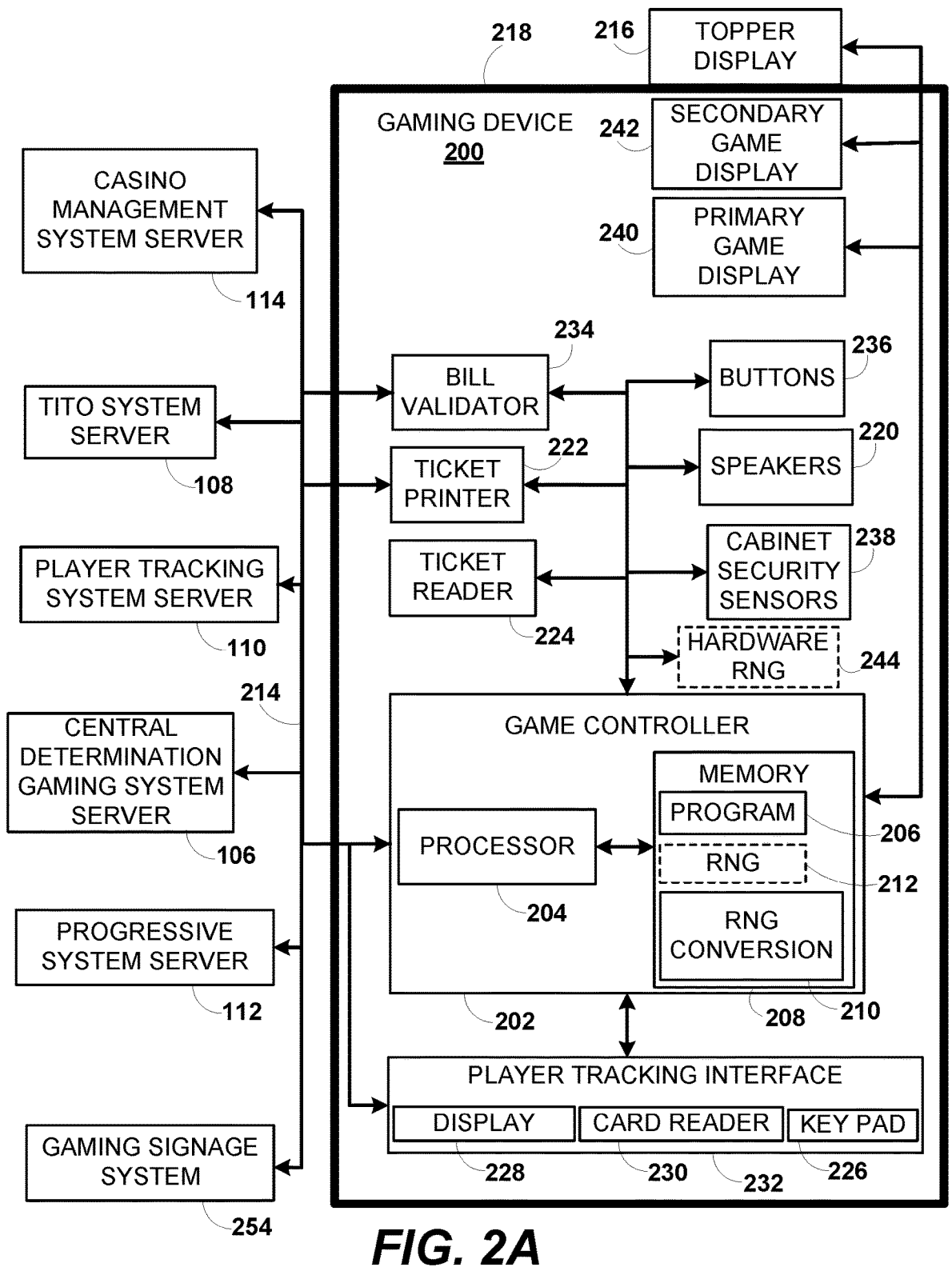
FIG. 2A is a block diagram showing various functional elements of an exemplary EGM.

Gaming devices 104A have traditionally also included a handle 132 typically mounted to the side of main cabinet 116 which may be used to initiate game play. Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc' model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game feature display for bonus play, to show game features or attraction activities while a game is not in play, or any other information or media desired by the game designer or operator. In some implementations, the optional topper screen 140 may also or alternatively be used to display progressive jackpots available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus game features, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. Similar to FIG. 1, gaming device 200 can be specially configured to generate random based game outcomes using a repeat accrual meter mechanic. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2A also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that does not retain data values upon loss of power. Nonvolatile memory is memory that does retain data upon a loss of power. Examples of memory 208 include random access memory (RAM), read-only memory (ROM), hard disk drives, solid-state drives, universal serial bus (USB) flash drives, memory cards (e.g., Compact Fast (CFast) memory card), floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via UI) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred throughout this disclosure as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features (e.g., bonus game feature, special mode, secondary game feature, and/or other supplemental game features). In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a predetermined level of RTP (e.g., RTP of at least 75%) for a game (also referenced throughout the disclosure as a "target game RTP"). A game can use one or more lookup tables (also referenced throughout this disclosure as "weighted tables") as part of a technical solution that satisfies regulatory requirements for randomness and RTP. In particular, a lookup table can integrate game features (e.g., trigger events for special modes or bonus game features; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target game RTP. In general, volatility refers to the frequency or probability of an event such as a special mode, payout, etc. For example, to achieve a specific target game RTP, a higher-volatility game may have a lower payout most of the time with an occasional bonus having a very high payout, while a lower-volatility game has a steadier payout with more frequent bonuses of smaller amounts. Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables and/or reel strips to translate the RNG outcome to a symbol element, stop position for a reel strip, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table and/or reel strips to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment, and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive game credit awards based on the outcome of winning instances. The credit balance is decreased by the amount of each wager and increased upon a win. The player can add additional game credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus game feature or select various items during a feature game). The player may make these selections using the player-input buttons 236, the primary game display 240 which may be a touch screen or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2A. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2A are examples to facilitate ease of description and explanation.

Figure 2B:
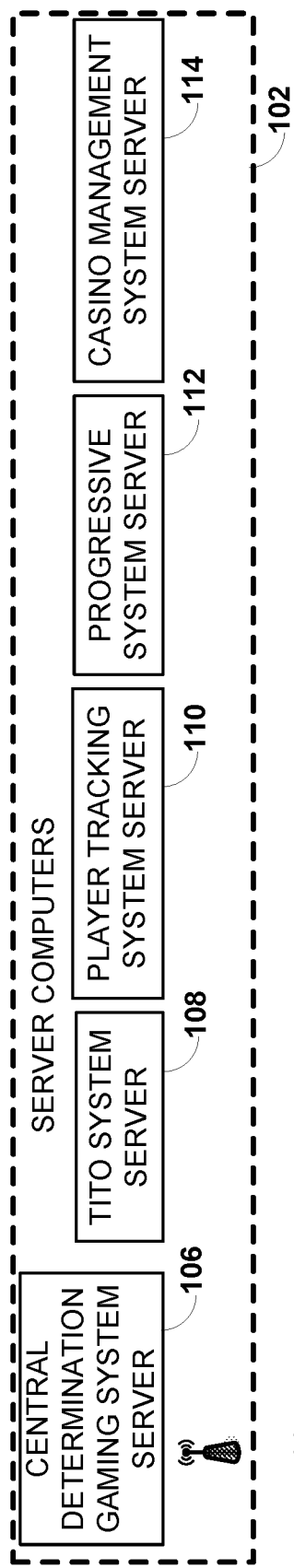
FIG. 2B depicts a casino gaming environment according to one example.
Figure 2B:
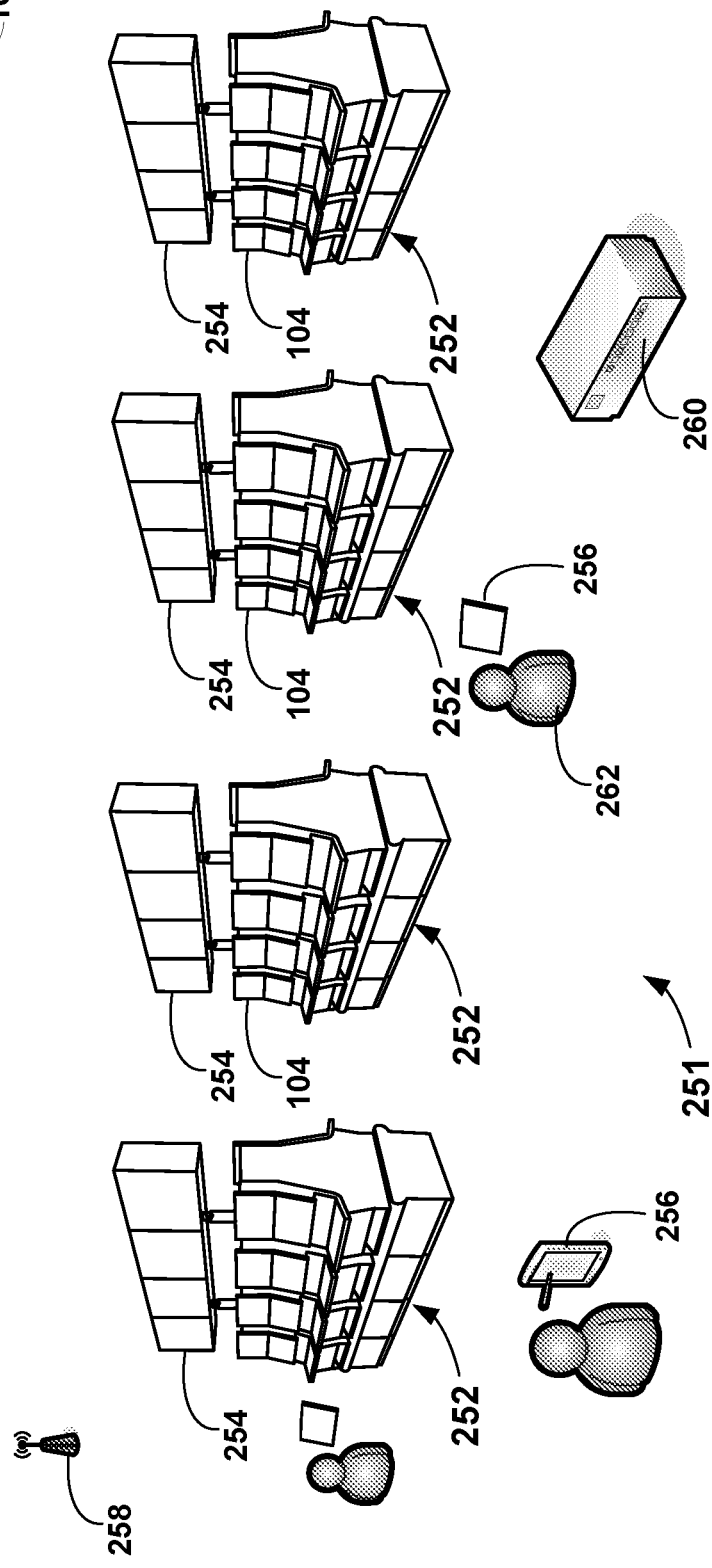

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones, dedicated gaming consoles, and/or other handheld or portable devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264a, 264b and 264c are capable of communication via one or more networks 417. The networks 417 may, for example, include one or more cellular telephone networks, the Internet, etc. In this example, the EUDs 264a and 264b are mobile devices: according to this example the EUD 264a is a tablet device and the EUD 264b is a smart phone. In this implementation, the EUD 264c is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282a, servers 284a and one or more workstations 570a. The servers 284a may, for example, be configured to provide access to a library of games for online game play. In some examples, code for executing at least some of the games may initially be stored on one or more of the storage devices 282a. The code may be subsequently loaded onto a server 284a after selection by a player via an EUD and communication of that selection from the EUD via the networks 417. The server 284a onto which code for the selected game has been loaded may provide the game according to selections made by a player and indicated via the player's EUD. In other examples, code for executing at least some of the games may initially be stored on one or more of the servers 284a. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284b, storage devices 282b, and one or more workstations 286b. According to this example, the financial institution data center 270 is configured to maintain financial accounts, such as checking accounts, savings accounts, loan accounts, etc. In some implementations one or more of the authorized users 274a-274c may maintain at least one financial account with the financial institution that is serviced via the financial institution data center 270.

According to some implementations, the gaming data center 276 may be configured to provide online wagering games in which money may be won or lost. According to some such implementations, one or more of the servers 284a may be configured to monitor player credit balances, which may be expressed in game credits, in currency units, or in any other appropriate manner. In some implementations, the server(s) 284a may be configured to obtain financial credits from and/or provide financial credits to one or more financial institutions, according to a player's "cash in" selections, wagering game results and a player's "cash out" instructions. According to some such implementations, the server(s) 284a may be configured to electronically credit or debit the account of a player that is maintained by a financial institution, e.g., an account that is maintained via the financial institution data center 270. The server(s) 284a may, in some examples, be configured to maintain an audit record of such transactions.

In some alternative implementations, the gaming data center 276 may be configured to provide online wagering games for which game credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274a-274c), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Example Game Processing Architecture

Figure 3:
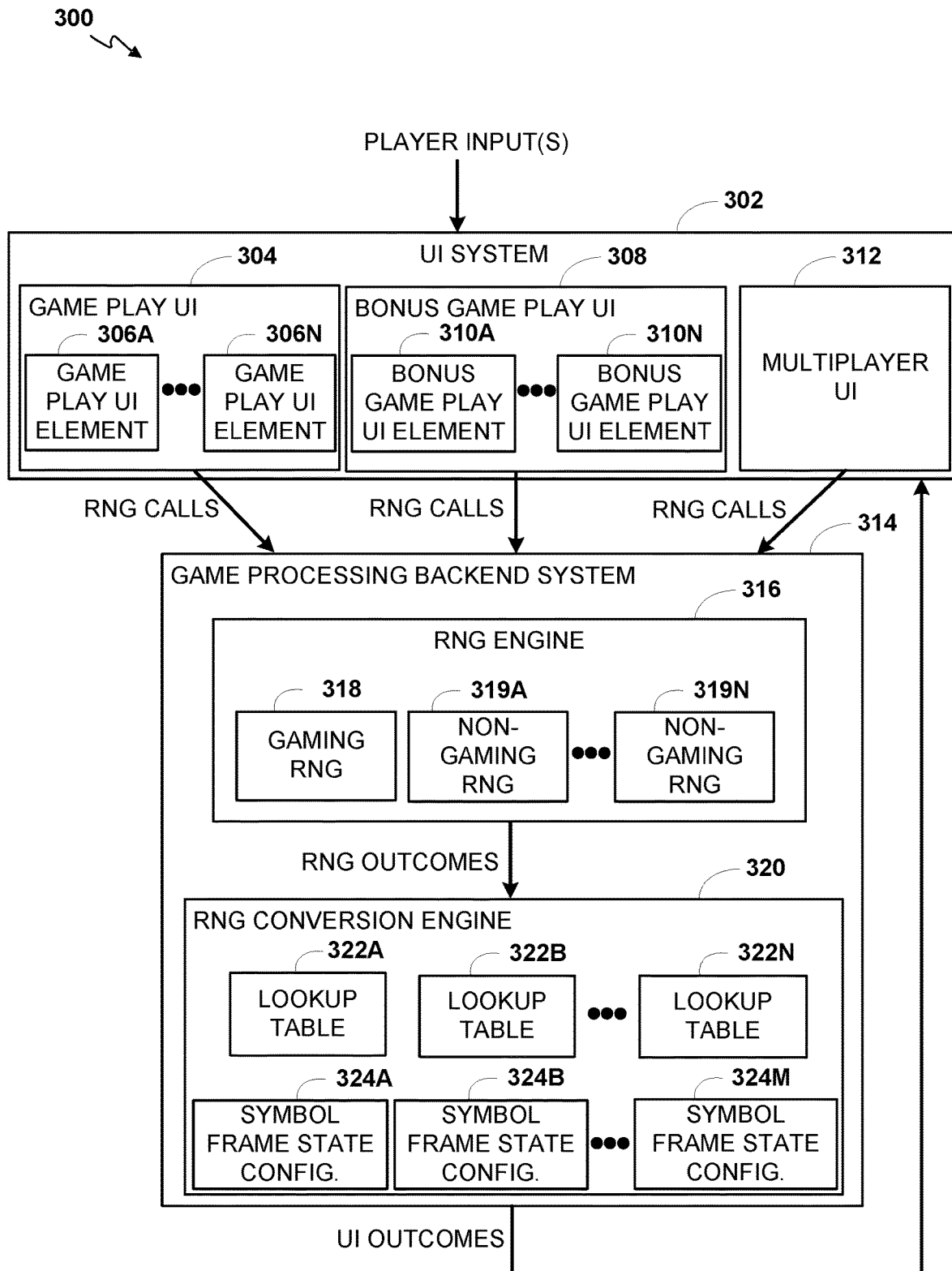
FIG. 3 illustrates, in block diagram form, an implementation of a game processing architecture that implements a game processing pipeline for the play of a game in accordance with various implementations described herein.

FIG. 3 illustrates, in block diagram form, an implementation of a game processing architecture that implements a game processing pipeline 300 for the play of a game in accordance with various implementations described herein. As shown in FIG. 3, the gaming processing pipeline 300 starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes, for example random numbers. The RNG outcomes are then sent to the RNG conversion engine 320 to generate one or more game outcomes for the UI system 302 to display to a player. A gaming device, such as gaming devices 104A-104X and 200 shown in FIGS. 1 and 2A, respectively, can implement the game processing pipeline 300. Alternatively, portions of the game processing pipeline 300 can be implemented using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels in a reel area) are shown and/or made available to a user. In a subsequent game instance, the UI system 302 could transition out of the base game to one or more bonus game features. The bonus game play UI 308 represents a UI that utilizes bonus game play UI elements 310A-310N for a player to interact with and/or view during a bonus game feature. In one or more implementations, at least some of the game play UI element 306A-306N are similar to the bonus game play UI elements 310A-310N. In other implementations, the game play UI element 306A-306N can differ from the bonus game play UI elements 310A-310N.

In one or more implementations, the game processing pipeline 300 can incorporate the example implementations described herein into various types of reel games. In particular, a reel game includes a base reel game shown with game play UI 304 or bonus reel game shown with bonus game play UI 308. Generally, a base, or primary, reel game includes play that involves spinning reels. A bonus reel game can add the possibility of winning a relatively large payout. A bonus reel game may require an additional wager, but typically does not. For purposes of this disclosure, a bonus reel game can be a type of supplemental game feature the game processing pipeline 300 can implement.

For a reel game, the game play UI 304 and/or bonus game play UI 308 includes a reel area that encloses viewable portions of a set of reels associated with the reel area. For each reel strip, the viewable portion of the reel strips includes one or more positions for symbols. Thus, the reel area is a matrix of symbols on a UI and may be highlighted to emphasize reel strips and symbols within the reel area. The number of reel strips and dimensions of the reel area depend on implementation. In some typical configurations, a reel area has an m×n configuration, with m reels and with n symbols visible per reel. For example, for a base reel game, a reel area can have a 5×3 configuration—five reels per window, with three symbols showing in the window for each of the reels. More generally, the reel area spans m reels in a first dimension and spans n symbols in a second dimension orthogonal to the first dimension, where the value of m can be 4, 5, 6, 7, 8, or some other number of reels, and the value of n can be 2, 3, 4, 5, 6, or some other number of symbols. Typically, the m reels are arranged horizontally in the reel area from left-to-right, with the m reels spinning vertically and the reel area showing n symbols of each of the respective reels. Alternatively, them reels are arranged vertically in the reel area from top-to-bottom, with the m reels spinning horizontally and the reel area showing n symbols of each of the respective reels. Alternatively, a reel area can have another configuration. For example, a reel area can have different numbers of symbols visible for different reels (e.g., going left to right in a reel area, two symbols visible for a leftmost reel, three symbols visible for a second reel, four symbols visible for a center reel, three symbols visible for a fourth reel, and two symbols visible for a rightmost reel), or as further explained below, a reel area can have a p×q configuration, with p×q reels visible in a rectangular reel area, and a single symbol visible per reel.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. As an example, in a reel game, to determine the random base game outcome, the RNG conversion engine 320 includes reel strips that vary in symbol pattern and reel strip length. Each reel strip includes x positions along a one-dimensional strip of symbols, where x depends on implementation. For example, x is 30, 80, 100, 200, or some other number of positions. The value of x can be the same or different for different reels (thus, different reels can have different numbers of positions). Each reel can have a data structure (e.g., array, linked list) that tracks the symbols at the respective positions of the reel strip for the reel. In some example implementations, the configuration of the symbols at the positions of the reel strips for the reels of a reel game is fixed after the reel game boots, although limited reconfiguration operations may be permitted. In other example implementations, the configuration of the symbols at the positions of the reel strips for the reels of a reel game can change dynamically after the reel game boots (e.g., depending on bet level or some other factor). Different sets of reels can be used for a base reel game and bonus reel game (or other supplemental game feature such as a special mode of the base reel game). For example, for a special mode of a base reel game, more "valuable" symbols, such as wild symbols or scatter symbols, can be added to the reels of a base reel game or swapped in for other symbols on the reels.

RNG conversion engine 320 could also utilizes one or more lookup tables 322A-322N, which are also called weighted tables, to regulate a prize payout amount for each RNG outcome and how often the gaming device pays out the derived prize payout amounts. To do so, RNG conversion engine 320 can determine various game outcomes and perform operations for various types of base game features and/or supplemental game features (e.g., a bonus game feature). Although not shown in FIG. 3, the RNG conversion engine 320 could store and/or utilize one or more sets of reel strips, where each set of reel strips has different reel strip patterns. The RNG conversion engine 320 can also store (e.g., as data structures) and/or utilize one or more lookup tables 322 to assign probabilities to different options. For example, the RNG conversion engine 320 selects one of the different options based on a random number for the RNG outcome, where the different options are represented in different entries of a lookup table 322.

In one or more implementations, for a given lookup table 322, the probabilities for different options can be reflected in table entry values (e.g., for a random number RND associated with a RNG outcome, generated by an RNG, in the range of $0<RND<=40$ for option 1, $40<RND<=70$ for option 2, $70<RND<=90$ for option 3, and $90<RND<=100$ for option 4, given four options and a random number RND where $0<RND<=100$). The table entry values can represent percentages or, more generally, sub-ranges within the range for a random number. In some implementations, the table entry values for a lookup table 322 are represented as count values (which can also be referend throughout the disclosure as "weights") for the respective entries of the lookup table. As an example, the following table shows count values for the four options described above:

TABLE 1

Example Lookup Table

| count value | entry |
|---|---|
| 40 | <value a1, value a2, . . .> |
| 30 | <value b1, value b2, . . .> |
| 20 | <value c1, value c2, . . .> |
| 10 | <value d1, value d2, . . .> |

The sum total of the count values indicates the range of the options. The game processing backend system 314 can use a random number for an RNG outcome, generated between 1 and the sum total of the count values, to select one of the entries in the lookup table 322 by comparing the random number to successive running totals. In the example shown in Table 1, if the random number for the RNG outcome is 40 or less, the RNG conversion engine 320 selects the first entry. Otherwise, if the random number for the RNG outcome is between 41 and 70, RNG conversion engine 320 selects the second entry. Otherwise, if the random number for the RNG outcome is between 71 and 90, the RNG conversion engine 320 selects the third entry. Otherwise, the RNG conversion engine 320 selects the last entry. The table entry values for a lookup table 322 can be fixed and predetermined, can vary dynamically (e.g., depending on bet level), or can be dynamically selected (e.g., depending on bet level, depending on another factor) from among multiple available lookup tables. Different game parameters or choices during game play can use different lookup tables 322, or different combinations of game parameters or choices can be combined in entries of a given lookup table 322.

In general, after the reel strips have landed to produce a random based game outcome (also referenced throughout the disclosure as "reel stops"), the game processing backend system 314 identifies any win conditions and any win amounts to award to the player (e.g., credited to the player's credit balance). In some examples, win conditions depend on a count of credit symbols that land after the reel stops. In other examples, win conditions are defined as paylines (also called win lines) across at least a portion of a reel area on a display screen. For a round of play, game processing backend system 314 awards a win amount when a certain combination of symbols appears along a payline. Win amounts can vary according to the combination of symbols and according to the particular payline along which the combination of symbols land. In one or more implementations, instead of evaluating win conditions on paylines across reels, the game processing backend system 314 can determine an award according to a "ways" approach. The game processing backend system 314 typically determines the win amounts according to a pay table, where the pay table comprehends the various combinations of symbols and/or paylines that may occur (e.g., the win conditions). The win amount for a round of play may be a fraction of an amount wagered for that round of play for certain win conditions. For other win conditions, the win amount may be much larger than the amount wagered.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game feature, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline 300.

Symbol Frame Mechanics

With reference to FIG. 3, to implement one or more symbol frame mechanics in a base game and/or supplemental game feature, the UI system 302 could initially present a base game to a player using the game play UI 304. After a player sets a wagering amount and initiates a game instance (can also be referred to within this disclosure as a "round of play" or for a slot game context as a "spin"), the game play UI 304 presents to a player a random based game outcome that includes one or more special symbols. In a slot game context, the game play UI 304 includes a reel grid with multiple symbol window positions. When a special symbol lands on a given symbol window position in the reel grid, the game play UI 304 creates a symbol frame that highlights the given symbol window position. In one or more implementations, the game play UI 304 also presents a game instance indicator that represents a number of remaining game instances (e.g., three game instances) before the symbol frame expires and disappears from the reel grid. For purpose of this disclosure, the phrase "symbol frame" refers to highlighting a specific symbol window position in a grid or matrix presentation. Other terms or phrases that can be interchanged with "symbol frame" throughout this disclosure include "symbol border," "symbol outline," "symbol marker," or "symbol ring." Moreover, the phrase "game instance indicator" can be referenced within this disclosure as a "round of play indicator" or for a slot game context a "spin indicator." The phrase "special symbol" refers to a designated, symbol type that triggers the creation of a symbol frame.

Prior to initiating a subsequent game instance, the game play UI 304 reduces the count of the game instance indicator for preexisting symbol frames to denote a reduction of the remining game instances before the preexisting symbol frames expire. For purposes of this disclosure, the phrase "preexisting symbol frame" refers to an unexpired symbol frame that is present prior to generating a random based game outcome for a game instance. In the subsequent game instance, if a special symbol lands within a preexisting symbol frame, the game play UI 304 displays a reset of the game instance indicator for the symbol frame by changing the game instance indicator to a designated number of remaining game instances (e.g., three game instances). The game play UI 304 could also present an upgrade of the preexisting symbol frame to a different stage by presenting a multiplier value (e.g., ×2, ×3, and ×5) for the preexisting symbol frame. For example, if a special symbol lands in a preexisting symbol frame that is at a first stage with no assigned multiplier value, the game play UI 304 displays an upgrade animation that upgrades the preexisting symbol frame to the next stage by presenting a multiplier value (e.g., ×2). Afterwards, if another special symbol lands in the same preexisting symbol frame before expiring, the game play UI 304 presents another upgrade animation that upgrades the preexisting symbol frame to the next stage (e.g., stage three) and increases the assigned multiplier value (e.g., ×3 or ×5).

The game play UI 304 presents a payout of credit symbols when a credit symbol lands in a preexisting symbol frame. As an example, when a credit symbol lands in a preexisting symbol frame that is at an initial stage without an assigned multiplier value, the game play UI 304 reveals a payout according to the credit value for the credit symbol. In another example, when the preexisting symbol frame is at a higher stage (e.g., stage 2) that has an assigned multiplier value, the gaming device shows a payout that is greater than the credit value for the credit symbol. As an example, the payout is based on multiplying the credit value for the credit symbol that lands in the preexisting symbol frame with the assigned multiplier value. After the game instance indicator for the preexisting symbol frame decrements to reach a designated, minimum number of spins (e.g., zero), the game play UI 304 removes the preexisting symbol frame at the specific window position. The game play UI 304 can show decrementing game instance indicators for any preexisting symbol frame that were not upgraded during the current game instance.

In FIG. 3, to track symbol frames that appear in symbol window positions, the game processing backend system 314 stores one or more symbol frame state configurations 324 in RNG conversion engine 320. Each symbol frame state configuration 324 represents the current state of symbol frames for a given game configuration, which game processing backend system 314 stores and maintains in non-volatile memory (e.g., memory 208 in FIG. 2A). Different game parameters associated with the current state of the symbol frames are defined within each symbol frame state configuration 324. When a game progresses to the next state, symbol frame state configuration 324 stores the updated game parameters and other relevant data. In some cases, the game processing backend system 314 does not advance to the next state until the game processing backend system 314 stores information that allows the next state to be reconstructed as the current state. In the event of a power failure or other malfunction, the game processing backend system 314 will return to its current state when the power is restored by recovering state information associated with the symbol frames from non-volatile memory. The value of one or more game parameters associated with the state of the symbol frames can be recorded periodically, in response to some event such as user input, or whenever the value of the game parameter changes. This way, the game processing backend system 314 can recover the symbol frame state from the appropriate symbol frame state configuration 324 in case of a power failure or "tilt" event, allowing the gaming device to reconstruct events that have taken place before the power failure or "tilt" event. In one or more implementations, one or more symbol frame state configurations 324 could be stored as part of one or more overall game states for a game.

To ensure a gaming device accurately generates a target game RTP and avoids producing game logic defects, the game processing backend system 314 allocates one symbol frame state configuration 324 to store the symbol frame state for a given game configuration. Using FIG. 3 as an example, the game processing backend system 314 includes symbol frame state configurations 324A-324M and manages a set of bet level configurations of 75 credits, 150 credits, 225 credits, 375 credits, and 750 credits that a player can chose from. Because of the different bet level configurations, the game processing backend system 314 assigns a separate symbol frame state configuration to each bet level configuration. As an example, the game processing backend system 314 assigns symbol frame state configuration 324A to store the symbol frame state for the 75 credits bet level configuration, another symbol frame state configuration 324B to store the symbol frame state for the 150 credits bet level configuration, another symbol frame state configuration 324C to store the symbol frame state for the 225 credits bet level configuration, and so forth. Based on this example, the game processing backend system 314 stores a total of five different symbol frame states using five different symbol frame state configurations 324. By doing so, the game processing backend system 314 ensures game consistency when a player decides to switch the bet level configuration from one game instance to another game instance. In particular, symbol frames that appear in a reel grid in game play UI 304 changes according to the symbol frame state configuration 324 associated with the updated bet level configuration. The game processing backend system 314 could also store symbol frame states in a separate symbol frame state configuration 324 to track symbol frames in a supplemental game feature.

Each symbol frame state configuration 324 stores a variety of game parameters relevant to tracking the current symbol frame state in a game instance. As an example, each symbol frame state configuration 324 could be a data structure with data that identifies the symbol window positions with symbol frames, remaining game instances left for each symbol frame (e.g., game instance indicator information), multiplier values for each symbol frame, and/or other relevant stage information for each symbol frame. As game instances continue to execute and progress, the game processing backend system 314 updates the corresponding symbol frame state configuration 324 for a given bet level. For example, when the game processing pipeline 300 initiates a game instance, the game processing backend system 314 reduces the count associated with the remaining game instances left for each preexisting symbol frame before the symbol frame expires. When moving to the next state, the game processing backend system 314 updates the game instance count for each symbol frame in the symbol frame state configuration 324 to generate the updated, current symbol frame state stored in the symbol frame state configuration 324.

In one or more implementations, the game processing backend system 314 performs a check on whether the remaining game instances for each symbol reaches a designated, minimum number of game instances (e.g., zero). The game processing backend system 314 could perform this check after reducing the count associated with the remaining game instances left for each preexisting symbol frame that was not upgraded during the current game instance. The game processing backend system 314 could reduce the count for the game instance indicator after performing a payout operation, after completing a game instance, and/or prior to initiating a subsequent game instance. The game processing backend system 314 performs the check using data from the appropriate symbol frame state configuration 324 to determine which preexisting symbol frames should be removed prior to the next game instance. For any preexisting symbol frame that reaches the designated, minimum number of remaining game instances left, the game processing backend system 314 determines that the symbol frame expires. The game processing backend system 314 updates the appropriate symbol frame state configuration 324 accordingly to represent that expired, preexisting symbol frames are removed prior to initiating the next game instance.

The game processing backend system 314 generates one or more random based game outcomes for the game instance. In a slot game context, to determine the results for one or more reels, the game processing backend system 314 performs one or more RNG pulls on lookup tables 322 depending on the number of reels. As an example, if a base game includes five reels, the game processing backend system 314 performs a total of five RNG pulls, one RNG pull for each reel, to determine the reel stops for each reel; thereby, generating the random based game outcome. In other implementations, the game processing backend system 314 generates one or more random based game outcomes for other types of games, such as keno and/or video lottery.

The game processing backend system 314 maps and evaluates the random based game outcome with the current symbol frame state stored in the appropriate symbol frame state configuration 324. With reference to FIG. 3, the game processing backend system 314 determines that symbol frame state configuration 324A is the appropriate symbol frame state configuration 324 because of the bet level set for the gaming device. The game processing backend system 314 evaluates the random based game outcome according to the current symbol frame state stored in symbol frame state configuration 324A. From this evaluation, if the game processing backend system 314 determines a special symbol lands within a preexisting symbol frame, the game processing backend system 314 resets the count for the remaining number of game instances left to a designated number of remaining game instances (e.g., three game instances). In implementations where game processing backend system 314 determines that preexisting symbol frames have been upgraded, the game processing backend system 314 updates the symbol frame state configuration 324A by assigning or increasing the multiplier value stored in symbol frame state configuration 324A when a special symbol lands within an unexpired symbol frame. For example, if a special symbol lands in a preexisting symbol frame that is at a first stage with no multiplier value assigned, the game processing backend system 314 assigns and stores a multiplier value (e.g., ×2) into symbol frame state configuration 324A. If another special symbol lands in another symbol frame with an assigned multiplier value (e.g., ×2), the game processing backend system 314 updates the multiplier value (e.g., ×3) associated with the next stage of the symbol frame and stores the update into symbol frame state configuration 324A. In one or more implementations, the game processing backend system 314 could upgrade one or more preexisting symbol frames to a maximum stage where any additional special symbol that lands in the unexpired symbol frames no longer triggers an upgrade.

The game processing backend system 314 also evaluates the random based game outcome with the corresponding symbol frame state configuration 324 (e.g., symbol frame state configuration 324A) to determine whether a payout operation occurs. The game processing backend system 314 determines a payout operation occurs when a credit symbol lands in a preexisting symbol frame. As an example, when a credit symbol lands in a preexisting symbol frame that is at an initial stage with no multiplier value, the game processing backend system 314 performs a payout operation according to the credit value for the credit symbol. In another example, when the preexisting symbol frame is at higher stage (e.g., stage 2) that has an assigned multiplier value, the game processing backend system 314 performs a payout operation based on multiplying the credit value for the credit symbol that lands in the unexpired symbol frame with the assigned multiplier value.

In one or more implementations, the UI system 302 randomly transitions from the game play UI 304 to a bonus game UI 308. After transitioning, the bonus game UI 308 can present a supplement game feature from a tiered, set of supplemental game features. The tiered, set of supplement game features represent similar supplemental game features that vary in volatility and on average, generate different payout tiers using a random boost mechanic that upgrades the credit values for one or more credit symbols. For example, the bonus game UI 308 can present a starting tier, supplemental game feature (e.g., standard feature) that applies no boost operation to credit values for the credit symbols. The bonus game UI 308 could also present a second tier, supplemental game feature (e.g., super or deluxe feature) by presenting a single boost animation that randomly boosts each credit symbol in a set of reels. In another example, the bonus game play UI 308 presents a third tier, supplemental game feature (e.g., mega or ultra feature) by presenting two boost animations that randomly boosts each credit symbol in the set of reels.

To randomly trigger one of the tiered, supplemental game features, the game processing backend system 314 performs an RNG pull from a lookup table 322 that is separate and independent from the RNG pulls for determining the random based game outcome in the base game. The lookup table 322 maps the RNG outcome to a tiered, supplemental game feature that should be triggered. For example, the game processing backend system 314 could determine to trigger a starting tier, supplemental game feature, a second tier, supplemental game feature, and a third tier, supplemental game feature. Based on the RNG pull, the game processing backend system 314 determines not to trigger any of the tiered, supplemental game feature, trigger a starting tiered, supplemental game feature, trigger a second tiered, supplemental game feature, or trigger a third tiered, supplemental game feature. Table 2, which is shown below, provides an example lookup table for randomly determining whether to trigger one of the tiered, supplemental game features.

TABLE 2

Example Lookup Table for Triggering a Tiered, supplemental game feature

| Count Value | Triggering Event |
|---|---|
| 200 | Do Not Trigger a Tiered, Supplemental Game Feature |
| 10 | Trigger Starting Tiered, Supplemental Game Feature |
| 5 | Triger Second Tiered, Supplemental Game Feature |
| 1 | Trigger Third Tiered, Supplemental Game Feature |

As shown in Table 2, the game processing backend system 314 is more likely to not trigger a tiered, supplemental game feature based on the 200 count value (also referred to as the weighted value). To maintain a target game RTP, the game processing backend system 314 is less likely to generate the tiered, supplemental game feature that on average provide a higher payout. Specifically, the starting tier, supplemental game feature is more likely to trigger than the second and third tier, supplemental game features. The third tier, supplemental game feature is the least likely to trigger according to Table 2.

If based on the random determination that the second or third tier, supplemental game feature should trigger, the game processing backend system 314 performs a boost operation that randomly boosts each credit value for a credit symbol. To vary volatility and/or average payout between the tiered, supplemental game features, the game processing backend system 314 applies a single boost operation for the second tier, supplemental game feature and two boost operations for the third tier, supplemental game feature. To determine the random boost value for a boost operation, the game processing backend system 314 performs an RNG pull from one or more lookup tables 322 that maps the RNG outcome to a boost value. For example, the game processing backend system 314 can utilize one lookup table 322 to randomly determine the boost value for all boost operations. In another example, the game processing backend system 314 could have separate lookup tables 322 for some of the boost operations. In particular, the game processing backend system 314 could have one lookup table 322 for one boost operation performed in the third tier, supplemental game feature and another lookup table 322 for the other boost operation performed in the third tier, supplemental game feature. The lookup tables 322 for the different boost operations could be weighted differently to increase the likelihood of selecting certain boost values. Table 3, which is shown below, provides an example lookup table for randomly determining a boost value for each credit symbol.

TABLE 3

Example Lookup Table for Determining a Boost Value

| Count Value | Boost Value |
|---|---|
| 20 | 0 |
| 10 | 1 |
| 6 | 2 |
| 2 | 3 |
| 2 | 4 |

From Table 3, the game processing backend system 314 randomly determines a boost value of zero to 4 for one or more credit symbols. A boost value of zero represents that the credit value is not increased for a credit symbol. If the game processing backend system 314 randomly determines that a boost value should be applied, the credit value for a credit symbol will increase. In one example, the boost value could represent a multiplier value or value used to determine a multiplier value. In another example, the boost value represents an increase in prize level associated with a prize table or credit volatility lookup table that defines the credit value of a credit symbol in the tiered, supplemental game feature. As shown in Table 3, the game processing backend system 314 is more likely to select smaller boost values than larger boost values. Other implementations could assign weights such that each boost value is weighted to be about the same or is more likely to select larger boost values than smaller boost values.

When the bonus game UI 308 presents a tiered, supplemental game feature, the bonus game UI 308 can show an increase in the number of created symbol frames and/or upgraded preexisting symbol frames presented in the tiered, supplemental game feature. In one example, the bonus game UI 308 can present a single game instance for the tiered, supplemental game feature. For the single game instance, the bonus game UI 308 could land numerous special symbols that create and/or upgrade symbol frames on the reel grid. Other examples could have the bonus game UI 308 present multiple game instances before the tiered, supplemental game feature ends. Afterwards, the UI system 302 transitions back to the game play UI 304 to present the base game. The created symbol frames and/or upgraded preexisting symbol frames presented by the bonus game UI 308 persist and remain in the base game presented by the game play UI 304. The game play UI 308 can present other subsequent game instances that could trigger payout when credit symbols land in the symbol frames created and/or upgraded during the tiered, supplemental game feature.

To increase the number of symbol frames and/or upgraded preexisting symbol frames using the tiered, supplemental game feature, the game processing backend system 314 uses the same symbol frame state configuration 324 (e.g., symbol frame state configuration 324A) to store symbol frame states for the base game and the tiered, supplemental game feature. In other words, the game processing backend system 314 does not switch to a different symbol frame state configuration 324 to track symbol frames in the tiered, supplemental game feature. Additionally, or alternatively, to increase the number of created symbol frames and/or upgraded preexisting symbol frames, after triggering a tiered, supplemental game features, the game processing backend system 314 randomly determines whether to swap out or modify the reel set pattern for a set of reel strips used in the base game. If the game processing backend system 314 randomly determines to modify the reel set pattern used in the base game, the game processing backend system 314 changes out one or more symbol types to a special symbol type, credit symbol type, and/or jackpot symbol type. By doing so, the game processing backend system 314 potentially increases the number of symbol frames created and/or upgraded in the tiered, supplemental game feature and/or the payout amount. In other scenarios, the game processing backend system 314 could swap out and replace the entire reel set pattern for the set of reel strips. As an example, to increase the number of created symbol frames and/or upgraded preexisting symbol frames in the tiered, supplemental game feature, the new reel set pattern could include one or more reel strips with mostly or all special symbols. Other examples could use a reel set pattern that includes mostly or all credit symbols or varying ratios of special symbols to credit symbols (e.g., 1:1 or 1:2).

Table 4 shown below is an example of a lookup table 322 the game processing backend system 314 uses to randomly determine whether to swap out or modify the reel set pattern for a set of reel strips in the base game.

TABLE 4

Example Lookup Table for Determining Reel Set Pattern

| Count Value | Reel Set Pattern Modification Operation |
|---|---|
| 9 | Modify Reel Set Patterns |
| 1 | Swap Out Reel Set Patterns with New Reel Set Patterns |

As shown in Table 4, lookup table 322 is weighted such that the game processing backend system 314 is more likely to modify the reel set patterns than swapping out reel set patterns. Other examples of lookup table 322 could equally weight modifying the reel set patterns and swapping out reel set patterns or weight swapping out the reel strip patterns to be more likely than modifying the reel set patterns. After the tiered, supplemental game features completes, the game processing backend system 314 updates the same symbol frame state configuration 324 and returns to the base game. When returning to the base game, the symbol frames created and/or upgraded during the tiered, supplemental game feature persist into the base game.

In one or more implementations, the game play UI 304 may eventually present a random based game outcome that satisfies a trigger condition for a supplemental game feature. As an example, for a given game instance, the game play UI 304 presents a random based game outcome that satisfies a trigger condition for a supplemental game feature (e.g., free game feature or jackpot feature). In one example, the random based game outcome satisfies the trigger condition when the number of target feature symbols lands exceeds a trigger count (e.g., six or more target feature symbols land in a reel grid for a given game instance). In another example, the random based game outcome satisfies the trigger condition when a combination of symbols lands in a certain sequence or pattern (e.g., lands three target feature symbol across three consecutive reels). For purpose of this disclosure, the phrase "target feature symbol" refers to a symbol type that can trigger a supplemental game feature. In one example, the target feature symbol could also trigger the creation of a feature symbol frame while in another example, the target feature symbol fails to trigger the creation of a feature symbol frame. A base game and/or supplemental game features could be designed to include special symbols, target feature symbols, or both special symbols and target feature symbols.

The UI system 302 then presents an animation that transitions the game from the game play UI 304 to the bonus game play UI 308. In one example, as part of the transition animation, the bonus game play UI 308 could create and/or upgrade feature symbol frames according to the target feature symbols that are responsible for triggering the supplemental game feature. In another example, the transition animation may not create feature symbol frames from target feature symbols that triggered supplemental game feature. The transition animation may also present an initial number of game instances allocated for the supplemental game feature (e.g., six initial spins). During the supplemental game feature, the bonus game play UI 308 could present random based game outcomes for one or more game instances that produce feature symbol frames. To produce feature symbol frames in the supplemental game feature, the bonus game play UI 308 could present landing target feature symbols and/or special symbols. In one or more implementations, the bonus game play UI 308 could also present a dynamic target feature symbol and/or dynamic special symbol that produces feature symbol frames. In addition to producing and/or upgrading feature symbol frames, the bonus game play UI 308 can generate animations that change the dynamic target symbol and/or dynamic special symbol into another symbol type after landing on a reel grid. Examples of other symbol types include a re-spin symbol (e.g., +1 spin symbol), a double upgrade symbol, and a variety of jackpot prize symbols, such as mini jackpot symbol, a minor jackpot symbol, a major jackpot symbol, and a grand jackpot symbol. The bonus game play UI 308 could also configure the dynamic target feature symbol and/or dynamic special symbol to be interactive where player input (e.g., touches a touchscreen) triggers the dynamic target feature symbol shown in the bonus game play UI 308 to reveal the new symbol type.

In contrast to the symbol frames in the base game, the symbol frames in the supplemental game feature (also referenced in this disclosure as "feature symbol frames") do not expire and remain until the supplement game feature ends. For a given game instance, if a target feature symbol and/or special symbol lands in a symbol window position without a feature symbol frame, the bonus game play UI 308 presents an animation that creates feature symbol frames at the corresponding symbol window positions. If a target feature symbol and/or special symbol lands within a feature symbol frame, the bonus game play UI 308 presents an animation that upgrades the feature symbol frame to a different stage by displaying a multiplier value (e.g., ×2 and ×5) with the feature symbol frame. Other implementations could have bonus game play UI 308 modify characteristics of the feature symbol frame, such as a color, size, shape, or orientation to signify multiplier values. At the last game instance of the supplemental game feature, the reels transform to include some or all credit symbols. When a credit symbol lands in a feature symbol frame without an assigned multiplier value, the bonus game play UI 308 presents a payout animation based on the credit value for the credit symbol. If the feature symbol frame has been upgraded to another stage associated with a multiplier value, the bonus game play UI 308 presents a payout animation based on multiplying the credit value for the credit symbol that lands in the feature symbol frame with the associated multiplier value.

In one or more implementations, the game processing backend system 314 switches from one symbol frame state configuration 324 to another symbol frame state configuration 324 when transitioning between the base game and the supplemental game feature triggered with target feature symbols. Using FIG. 3 as an example, when triggering the supplemental game feature, the game processing backend system 314 stores and preserves the current state of the symbol frames in the base game with symbol frame state configuration 324A. While transitioning to the supplemental game feature, the game processing backend system 314 switches to symbol frame state configuration 324B to determine, store, and load the initial state of the feature symbol frames when entering the supplemental game feature. The initial state of the feature symbol frames could be a default state (e.g., no feature symbol frames) or a state based on feature symbol frames created from landing target feature symbols in the base game. As the supplemental game feature progresses, the game processing backend system 314 stores and updates the symbol frame state into symbol frame state configuration 324B. After the supplemental game feature finishes, the game processing backend system 314 switches back to and loads the symbol frame state configuration 324A to restore the symbol frames that appeared in the base game prior to entering the supplemental game feature. Using two different symbol frame state configurations allows the game processing backend system 314 to prevent symbol frames created and/or upgraded in the supplemental game feature to persist when returning to the base game or vice versa.

In one or more implementations, the game processing backend system 314 generates feature symbol frames, but not symbol frames in the base game. Stated another way, game instances that execute in the base game do not generate special symbols that create and/or upgrade symbol frames. The game processing backend system 314, however, would generate target feature symbols that create and/or upgrade feature symbol frames. For these implementations, the gaming device would not switch between and/or load different symbol frame state configurations when transitioning between the base game and supplement game feature. Instead, the game processing backend system 314 could have a symbol frame state configuration to manage symbol frame states in the supplemental game feature.

Figure 4:
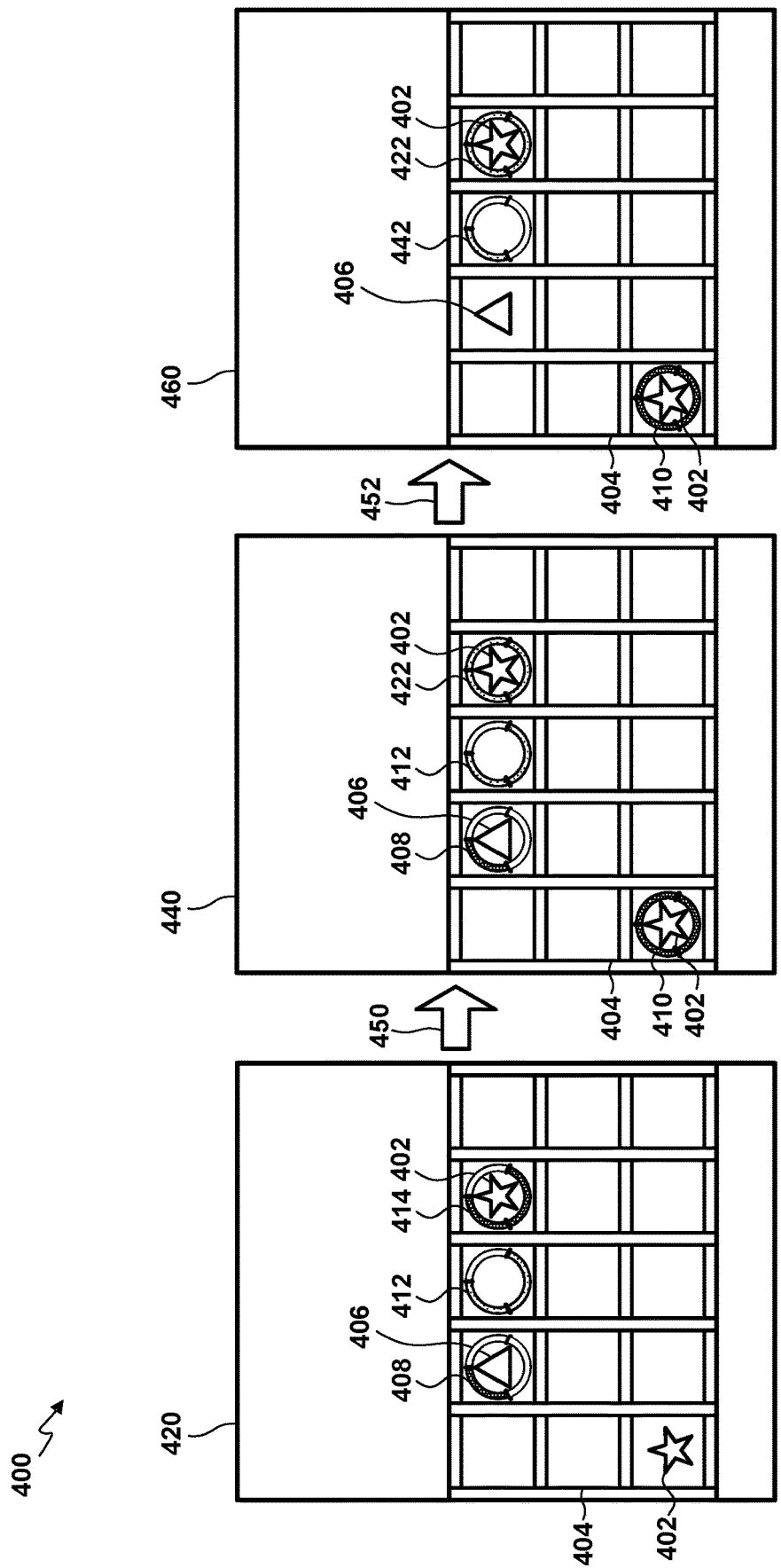
FIG. 4 is a diagram that depicts example general layouts of UIs related to presenting a symbol frame sequence.

FIG. 4 is a diagram that depicts example general layouts of UIs related to presenting a symbol frame sequence 400. Specifically, symbol frame sequence 400 depicts creating and/or upgrading symbol frames in a symbol frame mechanic. A gaming device can present symbol frame sequence 400 shown in FIG. 4 when executing a game program. Using FIG. 2A as an example, when a gaming device 200 executes game program 206, the gaming device 200 displays game play UIs 420, 440, and 460 on primary game display 240 and/or secondary game display 242. Additionally, or alternatively, at least some or all portions of the game play UIs 420, 440, and 460 could be presented on mechanical reels and/or other types of mechanical and/or electro-mechanical components not shown in FIG. 2A. Although for purposes of this disclosure, game play UIs 420, 440, and 460 present game play in a base game, other implementations can present the same symbol frame sequence 400 shown in game play UIs 420, 440, and 460 as a supplemental game feature (e.g., a free games bonus feature). Furthermore, even though game play UIs 420, 440, and 460 show blanks in certain symbol window positions, those blanks do not necessarily represent a blank symbol or no symbols landing on those symbol window positions. Rather, the blank symbols could be other symbol types (e.g., picture symbols or royal symbols) that are not shown to facilitate ease of discussion.

Game play UIs 420, 440, and 460 include a reel area 404 that includes a 5×3 reel configuration that corresponds to five vertical reels (e.g., reels 1-5) that are three symbols high. Reel 1 corresponds to the left most vertical reel (column 1) and reel 5 corresponds to the right most vertical reel (column 5). For a given reel stop, reel area 404 presents a total of 15 symbol window positions, where each reel in reel area 404 presents three symbol window positions. Other implementations of game play UIs 420, 440, and 460 could have other reel configurations (e.g., 5×4 reel configuration) that present a different number of symbol window positions (e.g., 20 symbol window positions). Although game play UIs 420, 440, and 460 show blanks in certain symbol window positions, those blanks do not necessarily represent a blank symbol or no symbols landing on those symbol window positions. Rather, the blank symbols could be other symbol types (e.g., picture symbols or royal symbols) that are not shown to facilitate ease of discussion.

Game play UIs 420, 440, and 460 can vary the characteristics of symbol frames 408, 410, 412, 414, 422, and 442 based on one or more game parameters. Using FIG. 4 as an example, symbol frames 408, 410, 412, 414, 422, and 442 are shown to have a meter with different fullness levels, where the meter for symbol frames 408 and 442 are only one third full; the meter for symbol frames 412 and 414 are two thirds full; and the meter for symbol frames 410 and 422 are completely full. The different meters shown for symbol frames 408, 410, 412, 414, 422, and 442 represent game instance indicators that correspond to the number of remaining game instances that are left before symbol frames 408, 410, 412, 414, 422, and 442 expires. Specifically, in FIG. 4, based on the level of fullness, symbol frame 408 represents an unexpired symbol frame at a first stage (e.g., no assigned multiplier value) with an one third fullness to represent one remaining game instance before expiring; symbol frame 412 represents an unexpired symbol frame at a second stage (e.g., assigned multiplier value of ×2) with a two third fullness to represent two remaining game instance before expiring; and symbol frame 414 represents an unexpired symbol frame at a first stage (e.g., no assigned multiplier value) with a two third fullness to represent two remaining game instance before expiring. Other implementations of game play UI 420 could use other types of game instance indicators, such as a counter or a varying number of rings, to represent the number of remaining game instance before the symbol frame expires.

Besides using meters with different levels of fullness, symbol frames 408, 410, 412, 414, 422, and 442 could also have a different shape, color, or some other characteristic to visually indicate the different stages amongst the symbol frame or other game parameters associated with the symbol frame. As shown in FIG. 4, symbol frames 412, 422, and 442 could have a different color (e.g., green) than symbol frames 408, 410, and 414 (e.g., yellow) because symbol frames 412, 422, and 442 are at the second stage and symbol frames 408, 410, and 414 are at the first stage. Other implementations of symbol frames 408, 410, 412, 414, 422, and 442 could include other forms of indicators, such as using a meter or text number, to represent one or more characteristics (e.g., stage) associated with symbol frames 408, 410, 412, 414, 422, and 442.

Game play UI 420 represents an initial UI that presents a random based game outcome that lands in reel area 404 in a first game instance. In FIG. 4, game play UI 420 shows that the random based game outcome lands a special symbol 402 on the bottom left most symbol window position in reel area 404. In other words, the special symbol 402 is located on the bottom row (e.g., row three) of reel 1 (e.g., column one) in reel area 404. Another special symbol 402 lands on the symbol window position located on the top row of reel 4 in reel area 404. The game play UI 420 also shows symbol frames 408, 412, and 414 on the top row of reels 2, 3, and 4 (e.g., columns 2-4). Symbol frames 408, 412, and 414 represent preexisting symbol frames that were present prior to initiating the first game instance.

Game play UI 420 also depicts a credit symbol 406 that lands in symbol frame 408. Based on the credit symbol 406 landing in symbol frame 408, the game play UI 420 presents a payout animation of credit symbols. With reference to FIG. 4, when a credit symbol 406 lands in symbol frame 408 the game play UI 304 reveals a payout according to the credit value for the credit symbol. Because the symbol frame 408 is at an initial stage, game play UI 420 provides no indication of multiplier value. If symbol frame 408 was a symbol frame at a higher stage (e.g., stage 2), game play UI 420 would show a payout animation that is based on multiplying the credit value for the credit symbol 406.

Recall that landing a special symbol 402 triggers the creation and/or upgrade of a symbol frame. By landing special symbols 402 shown in game play UI 420, symbol frame sequence 400 presents a symbol frame creation and upgrade animation 450 to transition from game play UI 420 to game play UI 440. Afterwards, game play UI 440 reveals the creation of a symbol frame 410 at the bottom left most symbol window position in reel area 404. Symbol frame 410 represents a new created symbol frame at a first stage (e.g., no assigned multiplier value) within the current game instance. Symbol frame 410 has three remaining game instances before expiring. Game play UI 440 also shows a symbol frame 422 that represents an upgraded preexisting symbol frame at a second stage with three remaining game instances before expiring. In game play UI 440, since special symbol 402 lands in symbol frame 414, game play UI 440 now displays a symbol frame 422 that is upgraded to the next stage. The game play UI 440 also presents that the meter for symbol frame 422 is entirely full to indicate that the count associated with the remaining game instances left has been reset to a designated number of remaining game instances (e.g., three game instances).

Game play UI 460 represents an UI shown after completing the first game instance and prior to initiating a second game instance. After presenting an updated symbol frame state with game play UI 440, the symbol frame sequence 400 presents a symbol frame reduction animation 452 to transition from game play UI 440 to game play UI 460. Recall that at the end of the game instance and prior to the next game instance, a gaming device reduces the count associated with the remaining game instances left for each preexisting symbol frame (e.g., symbol frames 408 and 412) that have not been upgraded during the current game instance. In FIG. 4, symbol frame reduction animation 452 does not reduce the remaining game instance count for symbol frames 410 and 422 since symbol frame 410 and 422 was created and upgraded, respectively, in the current game instance. Symbol frames 408 and 412 shown in game play UI 440 are preexisting symbol frames that were not upgraded. After presenting the symbol frame reduction animation 452, the count for symbol frame 408 reduces to zero causing symbol frame 408 to expire, and the count for symbol frame 412 reduces to one. Because the count for symbol frame 408 reaches the designated, minimum number of game instances (e.g., zero), game play UI 460 removes symbol frame 408. Game play UI 460 updates symbol frame 422 with symbol frame 442 to represent one remaining game instance is left before expiring.

Figure 5:
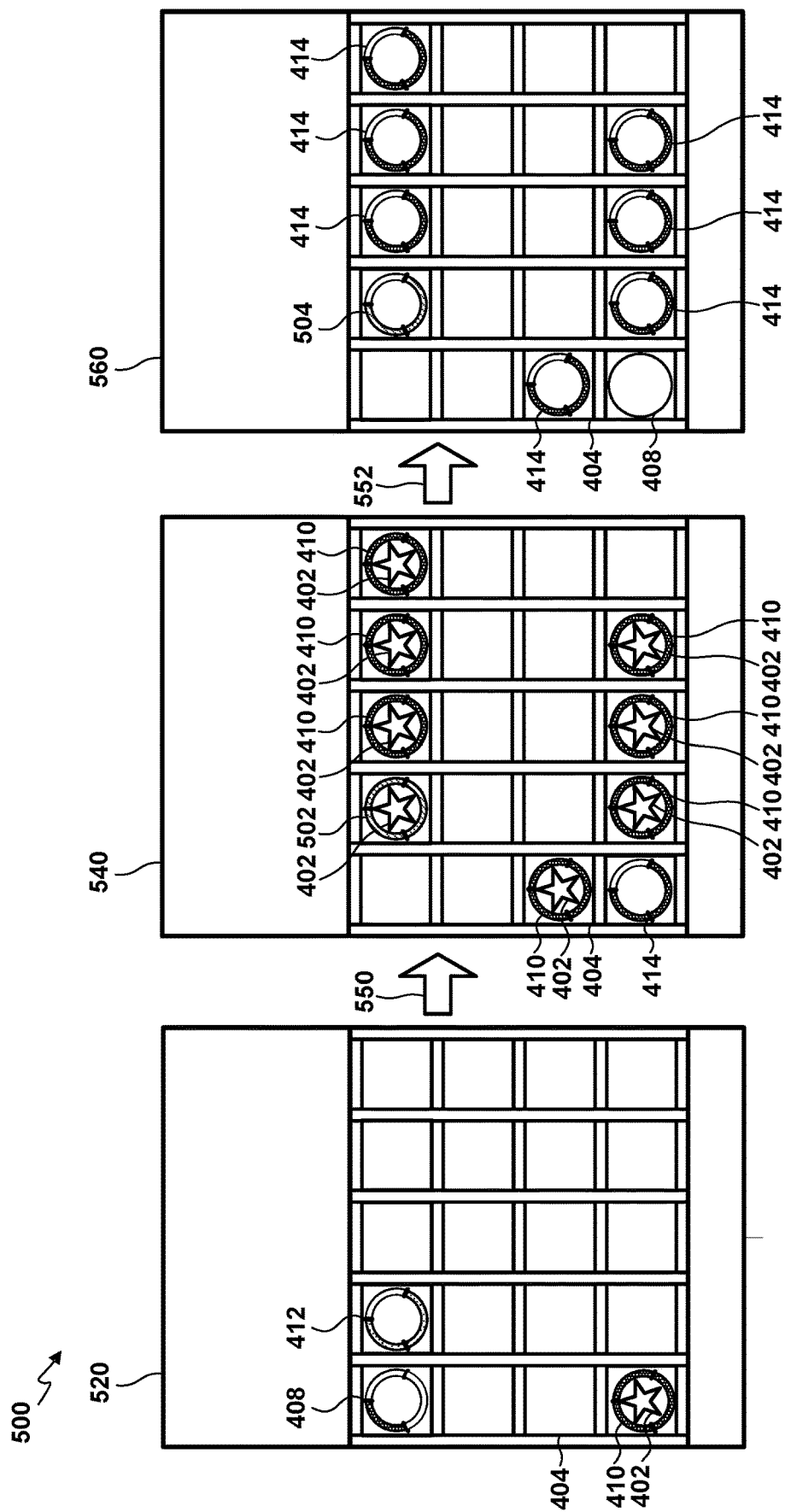
FIG. 5 is a diagram that depicts example general layouts of UIs related to presenting a symbol frame sequence that uses a similar symbol frame mechanic shown in symbol frame sequence in FIG. 4.

FIG. 5 is a diagram that depicts example general layouts of UIs related to presenting a symbol frame sequence 500 that uses a similar symbol frame mechanic shown in symbol frame sequence 400 in FIG. 4. Symbol frame sequence 500 depicts triggering and transitioning between a base game and a tiered, supplemental game feature using a symbol frame mechanic. Similar to symbol frame sequence 400, a gaming device can present symbol frame sequence 500 when executing a game program. Although for purposes of this disclosure, game play UIs 520 and 560 present game play in a base game, other implementations can present the same symbol frame sequence 500 shown in game play UIs 520 and 560 as a supplemental game feature (e.g., a free games bonus feature). Furthermore, even though game play UIs 520 and 560 and bonus game play UI 540 show blanks in certain symbol window positions, those blanks do not necessarily represent a blank symbol or no symbols landing on those symbol window positions. Rather, the blank symbols could be other symbol types (e.g., picture symbols or royal symbols) that are not shown to facilitate ease of discussion.

Similar to game play UI 460 shown in FIG. 4, game play UI 520 represents an UI shown after completing a first game instance and prior to initiating a second game instance in a base game. FIG. 5 illustrates that reel area 404 includes a 5×4 reel configuration that corresponds to five vertical reels (e.g., reels 1-5) that are four symbols high to produce a total of 20 symbol window positions. Within reel area 404, game play UI 520 presents symbol frames 408, 410, and 412. Symbol frames 408 and 410 are located in reel 1, and symbol frame 412 is located in reel 2. After presenting the symbol frame state with game play UI 520, the symbol frame sequence 500 presents a supplemental game feature animation 550 to represent triggering a tiered, supplemental game feature and generating a random based game outcome for the tiered, supplemental game feature. When a gaming device initiates the second game instance in the base game, a gaming device can randomly trigger the tiered, supplemental game feature independently from a random based game outcome shown for the base game. In one or more implementations, rather than completing the second game instance, the gaming device interrupts and replaces the second game instance with a game instance in the tiered, supplemental game feature. In other implementations, the second game instance completes execution and generates a random based game outcome. Afterwards, the gaming device triggers and enters the tiered, supplemental game feature.

Bonus game play UI 540 illustrates an updated symbol frame state after presenting a random based game outcome in the tiered, supplemental game feature. As previously disclosed, to increase the number of created symbol frames and/or upgraded preexisting symbol frames, a gaming device uses the same symbol frame state configuration to store symbol frame states for the base game and the tiered, supplemental game feature. By utilizing the same symbol frame state configuration, the meter fullness for symbol frames 408, 412, and 410 changes according to the random based game outcome generated for a game instance in the tiered, supplemental game feature. In particular, symbol frame 410 in game play UI 520 reduces by one and is now shown as symbol frame 414 in bonus game play UI 540; symbol frame 408 in game play UI 520 expires and is no longer shown in bonus game play UI 540; and symbol frame 412 in game play UI 520 upgrades to become symbol frame 502 in bonus game play UI 540. Based on the upgrade, symbol frame 502 resets back to a full meter, and the previously assigned multiplier value of ×2 increases to a multiplier value of ×3.

Bonus game play UI 540 also depicts landing seven other special symbols 402 within the reel area 404. From landing the special symbols 402, bonus game play UI 540 presents the creation of the seven new symbol frames 410. The seven new symbol frames 410 are persistent symbol frames that will remain present when returning to the base game. After presenting the symbol frame state with bonus game play UI 540, the symbol frame sequence 500 presents a base game return animation 552 to represent returning to a base game and generating a random based game outcome for the third game instance in the base game.

Game play UI 560 represents a UI shown after completing the third game instance and updating the symbol frame state accordingly. Recall that at the end of a game instance and prior to the next game instance, a gaming device reduces the count associated with the remaining game instances left for each preexisting symbol frame (e.g., symbol frames 410, 414, and 502). According to the count reduction, in FIG. 5, symbol frames 410 with a full meter in bonus game play UI 540 now becomes symbol frames 414 that is two thirds full in game play UI 560; symbol frame 502 with full meter in bonus game play UI 540 now becomes symbol frame 504 that is two thirds full in game play UI 560; and symbol frame 414 that was two thirds full in bonus game play UI 540 now becomes symbol frame 408 that is now one third full in game play UI 560.

Figure 6:
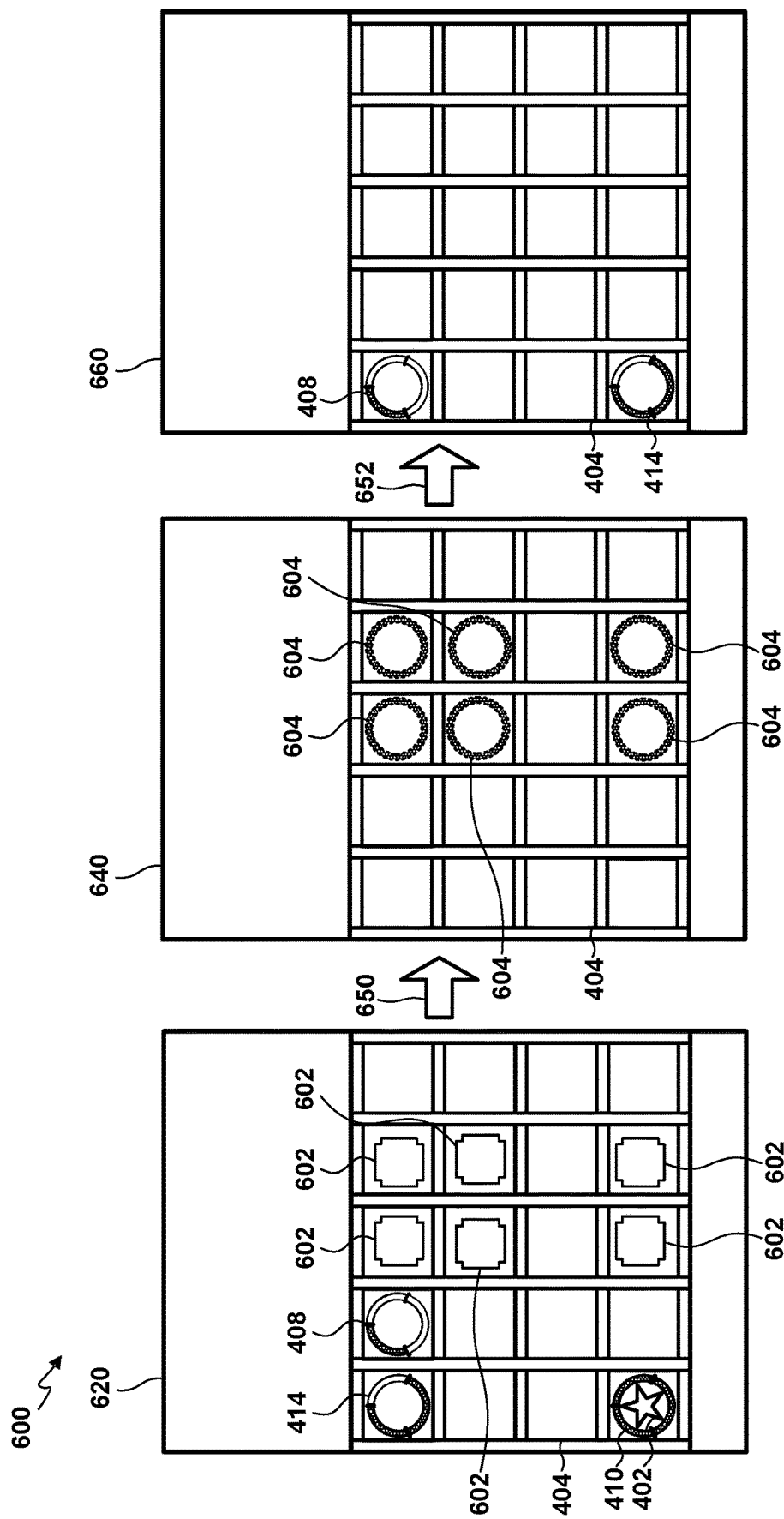
FIG. 6 is a diagram that depicts example general layouts of UIs related to presenting a symbol frame sequence.

FIG. 6 is a diagram that depicts example general layouts of UIs related to presenting a symbol frame sequence 600. Symbol frame sequence 600 depicts using a symbol frame mechanic in a supplemental game feature triggered by a random based game outcome in a base game. Similar to symbol frame sequences 400 and 500, a gaming device can present symbol frame sequence 600 when executing a game program. Although for purposes of this disclosure, game play UIs 620 and 660 present game play in a base game, other implementations can present the same symbol frame sequence 600 shown in game play UIs 620 and 660 as a supplemental game feature (e.g., a free games bonus feature). Furthermore, even though game play UIs 620 and 660 and bonus game play UI 640 show blanks in certain symbol window positions, those blanks do not necessarily represent a blank symbol or no symbols landing on those symbol window positions. Rather, the blank symbols could be other symbol types (e.g., picture symbols or royal symbols) that are not shown to facilitate ease of discussion.

Similar to game play UI 520 shown in FIG. 5, game play UI 620 represents an UI shown after completing a first game instance and prior to initiating a second game instance in a base game. FIG. 6 illustrates that reel area 404 includes a 5×4 reel configuration that corresponds to five vertical reels (e.g., reels 1-5) that are four symbols high to produce a total of 20 symbol window positions. Within reel area 404, game play UI 620 presents symbol frames 408, 410, and 414. Symbol frames 414 and 410 are located in reel 1, and symbol frame 408 is located in reel 2. Game play UI 620 also presents six target feature symbols 602 in reels 3 and 4. By landing six target features symbols 602, the symbol frame sequence 600 presents a supplemental game feature animation 650. The supplemental game feature animation 650 presents the change in symbol frame states when transitioning between the base game and the supplemental game feature. In one or more implementations where a base game does no generate symbol frames, symbol frames 408, 410, and 414 would not be shown in game play UI 520.

Bonus game play UI 640 illustrates an updated symbol frame state after triggering the supplemental game feature and prior to initiating the first game instance. As previously disclosed, a gaming device uses different symbol frame state configurations for the base game and supplemental game feature when a base game can generate symbol frames. By utilizing different symbol frame state configurations, symbol frames 408, 410, and 414 do not show up in bonus game play UI 640. Instead, feature symbol frames 604 are shown in symbol window positions where target feature symbols 602 landed in game play UI 620. Feature symbol frames 604 do not expire and are held until the supplemental game feature ends. When game instances execute in the supplemental game feature, landing target feature symbols 602 could create new feature symbol frames 604 and/or upgrade existing feature symbol frames 604.

In one or more implementations, each symbol window position in reel area 404 shown in bonus game play UI 640 can transform into its own reel. As shown in FIG. 6, bonus game play UI 640 includes 20 different symbol window positions. Rather than using the same 5×4 reel configuration that produces five independent vertical reels, the bonus game play UI 640 uses a different reel configuration that produces 20 independent reels. Stated another way, the bonus game play UI 640 uses 20 1×1 reels to generate a random based game outcome for a game instance in the supplemental game feature. In one or more implementations, on the last game instance of the supplemental game feature, the reel area 404 turns back into five independent vertical reels, where the five independent vertical reels include mostly or all credit symbols. Bonus game play UI 640 could also extend the five reels by adding two additional rows within the reel area 404 to create a 5×6 reel configuration. Other implementations of the supplemental game feature could maintain the 20 independent reels.

Using two different symbol frame state configurations allows the gaming device to prevent feature symbol frames 604 created and/or upgraded in the supplemental game feature to persist when returning to the base game. After the supplemental game feature completes, the symbol frame sequence 600 presents a base game return animation 652 to represent returning to a base game and generating a random based game outcome for the second game instance in the base game. When returning to the base game, the gaming device switches back to and loads the symbol frame state configuration associated with the base game. Game play UI 660 represents a UI shown after completing the second game instance in the base game and updating the symbol frame state accordingly. Recall that at the end of a game instance and prior to the next game instance, a gaming device reduces the count associated with the remaining game instances left for each preexisting symbol frame (e.g., symbol frames 408, 414, and 410). According to the count reduction, in FIG. 6, symbol frame 410 that has a full meter in game play UI 620 now becomes symbol frames 414 that is two thirds full in game play UI 660; symbol frame 414 that is two thirds full in game play UI 620 now becomes symbol frame 608 that is one third full in game play UI 660; and symbol frame 608 that is one third full in game play UI 620 expires and is not shown in game play UI 660.

Other implementations symbol frame sequence 600 could have game play UIs 620 and 660 not present symbol frames 408, 410, and 414. Stated another way, game instances that execute in the base game do not generate special symbols that create and/or upgrade symbol frames. The supplemental game feature shown in bonus game play UI 640 would still present target feature symbols 602 that generate feature symbol frames 604. For these implementations, the gaming device would not switch to and/or load different symbol frame state configurations when transitioning between the base game and supplement game feature.

Figure 7:
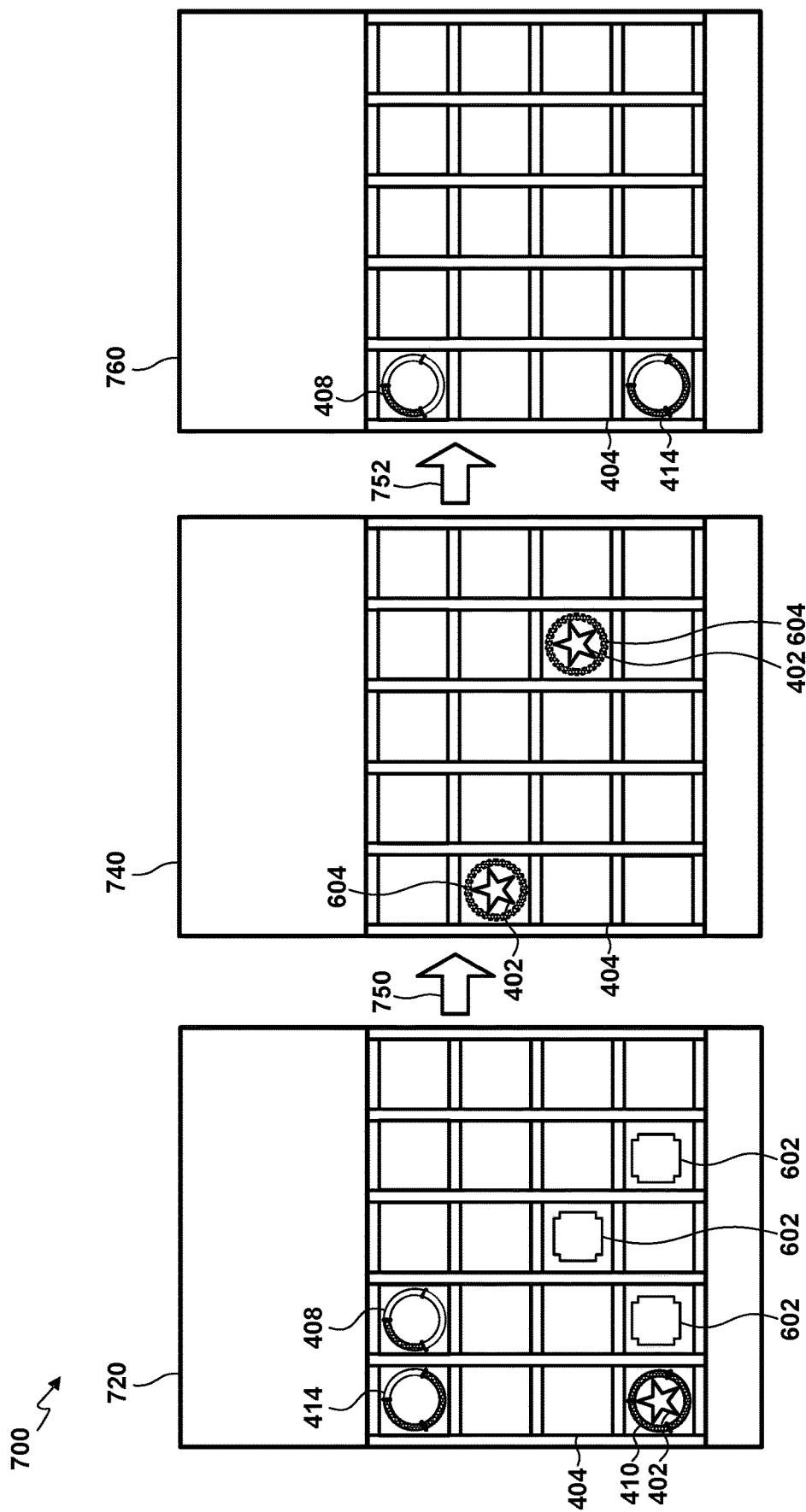
FIG. 7 is a diagram that depicts example general layouts of UIs related to presenting a symbol frame sequence.

FIG. 7 is a diagram that depicts example general layouts of UIs related to presenting a symbol frame sequence 700. The symbol frame sequence 700 is similar to symbol frame sequence 600 except that the supplemental game feature animation 750 is triggered by a particular sequence or combination of target feature symbols 602. Furthermore, the target features symbols 602 presented in the base game do not trigger the creation of feature symbol frames 604. As shown in FIG. 7, game play UI 720 presents three target feature symbols 602 across reels 2, 3, and 4. By landing the three target feature symbols 602 across reels 2-4, the symbol frame sequence 700 triggers the supplemental game feature animation 750. To trigger the creation of feature symbol frames 604, the bonus game play UI 740 illustrates the symbol frame state after completing the first game instance in the supplemental game feature. In bonus game play UI 740, multiple special symbols 402 land on the reels in reel area 404 to generate feature symbol frames 604. Additionally, or alternatively, bonus game play UI 740 could present target feature symbols 602 that land in reel area 404 trigger the creation of feature symbol frames 604.

A gaming device uses a different symbol frame state configuration to track symbol frames that appear in the supplemental game feature. Bonus game play UI 740 illustrates an updated symbol frame state after triggering the supplemental game feature and after completing a first game instance in the supplemental game feature. After the supplemental game feature completes, the symbol frame sequence 700 presents a base game return animation 752 to represent returning to a base game and generating a random based game outcome for the second game instance in the base game. Game play UI 760 represents a UI shown after completing the second game instance in the base game and updating the symbol frame state in the symbol frame state configuration associated with the base game.

Figure 8:
FIG. 8 is an example screenshot of a game play UI that corresponds to a themed version of the game play UIs shown in FIG. 5.

FIG. 8 is an example screenshot of a game play UI 800 that corresponds to a themed version of the game play UIs 520 or 560 shown in FIG. 5. The game play UI 800 has a substantially similar UI layout as the game play UIs 520 or 560, but with additional graphical elements associated with the game's theme. For example, the game play UI 800 depicts special symbols 402 as sun symbols. Moreover, similar to game play UIs 520 and 560, game play UI 800 presents a reel area 404 with 20 symbol window positions from a 5×4 reel configuration. Game play UI 800 also represents an UI shown after completing a game instance and prior to initiating the next game instance in a base game. Specifically, game play UI 800 represents a symbol frame state after reducing the count for the game instance indicators associated with preexisting symbol frames.

FIG. 8 depicts that the game instance indicators associated with symbol frames 412, 502, and 504 also include text information to present stage information within game play UI 800. Recall that symbol frames 412, 502, and 504 could be colored differently according to their corresponding stage information. As an example, symbol frames 412 could be colored green and symbol frames 502 and 504 could be colored pink. Game play UI 800 also represents stage information for preexisting symbol frames with text information. In FIG. 8, game play UI 800 labels symbol frames 412 with the text "2×" and symbol frames 502 and 504 with the text "3×." Text "2×" represents symbol frames 412 are assigned a multiplier value of two, and the text "3×" represents symbol frames 502 and 504 are assigned a multiplier value of three.

Figure 9:
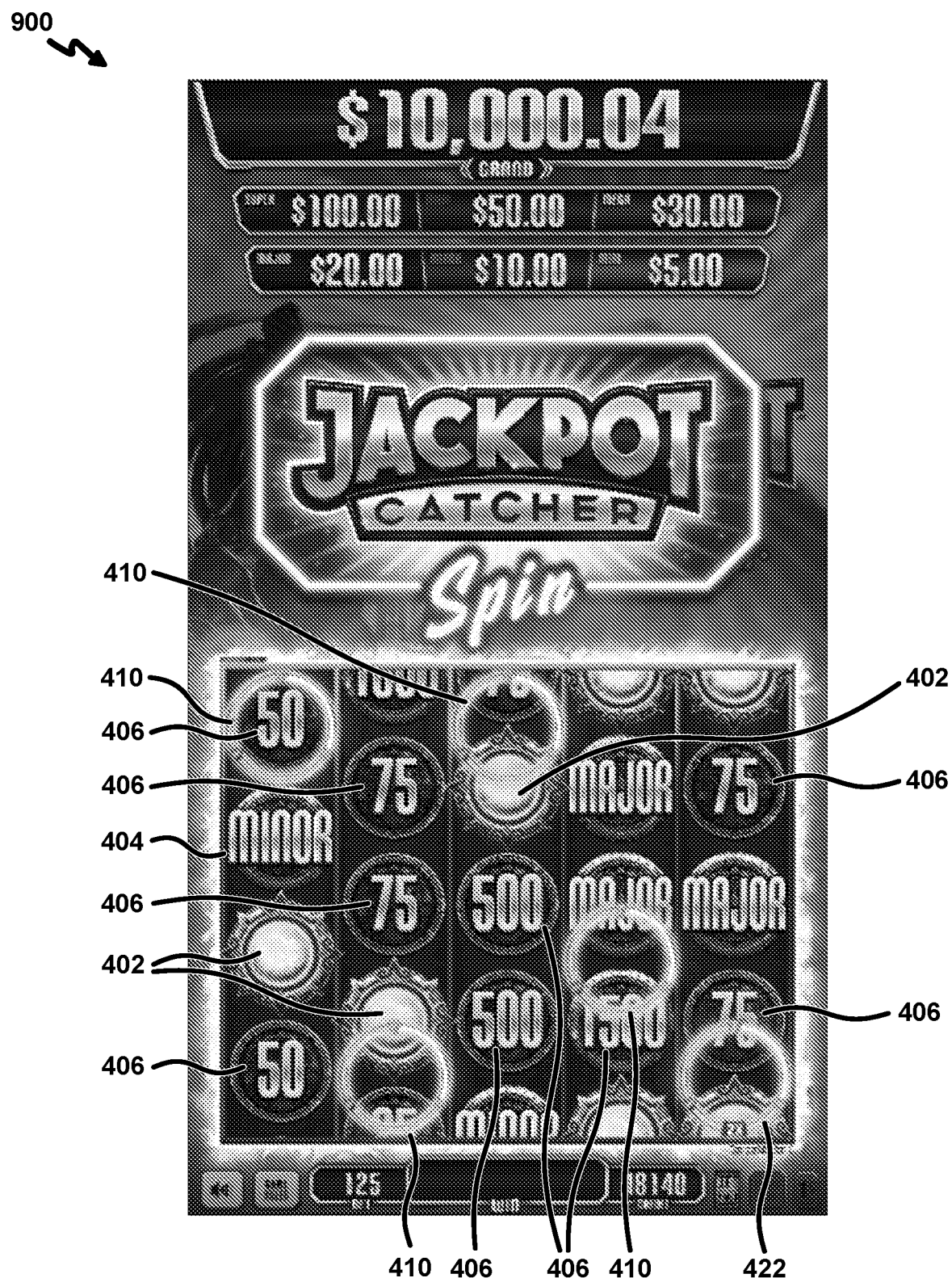
FIG. 9 is an example screenshot of a bonus game play UI that corresponds to a themed version of the bonus game play UI shown in FIG. 5.

FIG. 9 is an example screenshot of a bonus game play UI 900 that corresponds to a themed version of the bonus game play UI 540 shown in FIG. 5. The bonus game play UI 900 has a substantially similar UI layout as the bonus game play UI 540, but with additional graphical elements associated with the game's theme. In one example, the bonus game play UI 900 depicts special symbols 402 as sun symbols, credit symbols 406 with credit values, and a variety of jackpot symbols (e.g., minor and major symbols). Bonus game play UI 900 is shown being in a middle of a game instance (e.g., during a spin) for a tiered, supplemental game feature. In other words, the game instance shown in bonus game play UI 900 is in the process of presenting the generated random based game outcome to a player.

In one or more implementations, the bonus game play UI 900 presents reel strips that have been modified from a base game's reel strips. As previously disclosed with reference to FIG. 3, to increase the number of created symbol frames and/or upgraded preexisting symbol frames, a tiered, supplemental game feature modifies the reel set pattern used in the base game. The tiered, supplemental game feature changes out one or more symbol types to one or more designated symbol types. In bonus game play UI 900, certain symbol types from the base game are modified with special symbol types, credit symbol types, and/or jackpot symbol types. When modifying the reels in the base, the tiered, supplemental game feature potentially increases the chance of paying out credit symbols, awarding jackpot prizes, and creating and/or upgrading symbol frames for a base game.

Figure 10:
FIG. 10 is an example screenshot of a bonus game play UI that corresponds to a themed version of the bonus game play UI shown in FIG. 5.

FIG. 10 is an example screenshot of a bonus game play UI 1000 that corresponds to a themed version of the bonus game play UI 540 shown in FIG. 5. The bonus game play UI 1000 has a substantially similar UI layout as the bonus game play UI 540, but with additional graphical elements associated with the game's theme. Bonus game play UI 1000 is shown being in a middle of a game instance (e.g., during a spin) for a tiered, supplemental game feature. In contrast to bonus game play UI 900, bonus game play UI 1000 depicts reel strips that have been swapped out from a base game's reel strips after triggering the tiered, supplemental game feature. In bonus game play UI 1000, the new reel set pattern for the reel strips includes mostly or all special symbols. As shown in FIG. 10, because of the reel set pattern swap, the tiered, supplemental game feature will generate a screen full of symbol frames that the base game may subsequently trigger payouts on by landing credit symbols.

Figure 11:
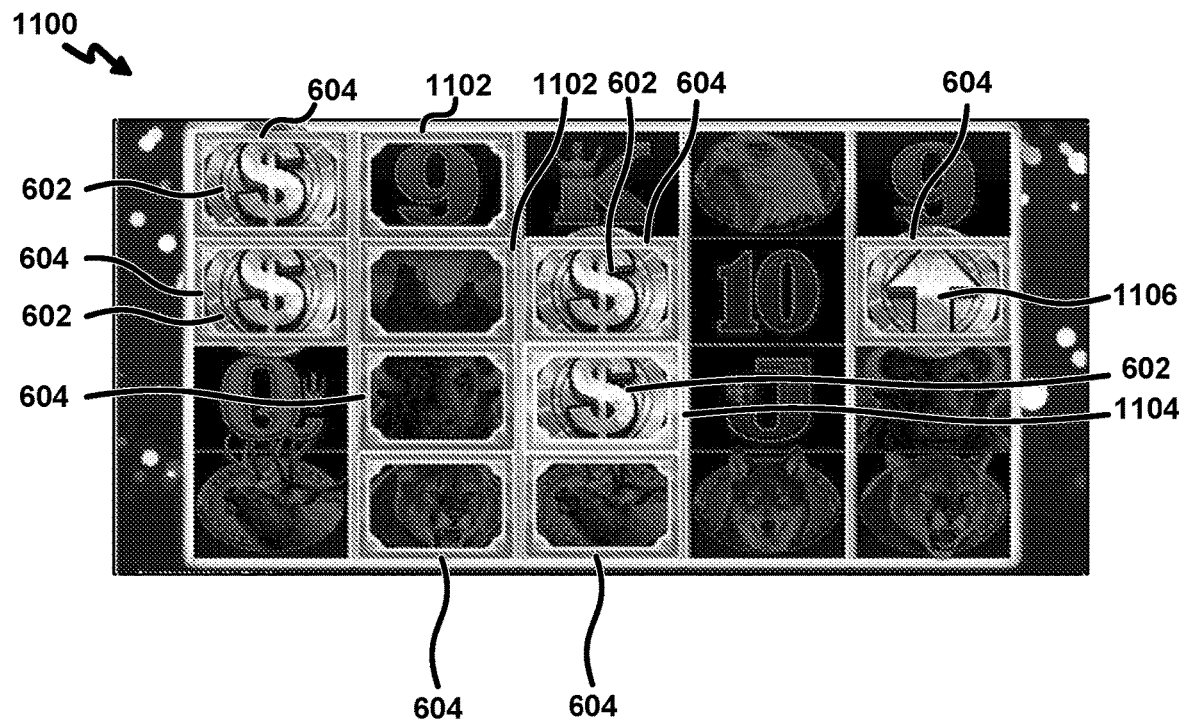
FIG. 11 is an example screenshot of a bonus game play UI that corresponds to a themed version of the bonus game play UI shown in FIG. 6.

FIG. 11 is an example screenshot of a bonus game play UI 1100 that corresponds to a themed version of the bonus game play UI 640 shown in FIG. 6. The bonus game play UI 1100 has a substantially similar UI layout as the bonus game play UI 640, but with additional graphical elements associated with the game's theme. Bonus game play UI 1100 is shown after completing a game instance for a supplemental game feature. As shown in FIG. 11, the random based game outcome lands four different target feature symbols 602 and a dynamic target feature symbol 1106. Three target feature symbols 602 create feature symbol frames 604 at their corresponding symbol window position. One target feature symbol 602 generates an upgraded feature symbol frame 1104. In FIG. 11, the dynamic target feature symbol 1106 not only generates and/or upgrades a feature symbol frame but can also changes to another symbol type. Feature symbol frame 1104 represents a feature symbol frame at the last stage (e.g., ×5 multiplier). Bonus game play UI 1100 also depicts feature symbol frames 1102 that are at a middle stage (e.g., ×2 multiplier). In on example, the supplemental game feature is set to have an initial number of game instances.

In one or more implementations, on subsequent game instances, if a target feature symbol 602 lands within feature symbol frame 1104, the bonus game play UI 1100 does not present an upgrade animation. Recall that feature symbol frame 1104 represents a feature symbol frame at the last stage (e.g., ×5 multiplier). Because feature symbol frame 1104 can no longer be upgraded, a bonus credit amount is revealed over the scatter symbol and paid out to the player. Additionally, or alternatively, landing a target feature symbol 602 within feature symbol frame 1104 could perform other operations, such as upgrading adjacent feature symbol frames (e.g., feature symbol frames 604) or adding a re-spin to the supplemental game feature. In some implementations, the bonus game play UI 1100 may present no animation and treat landing the target feature symbol 602 similar to landing a blank symbol.

In one or more implementations, each symbol window position corresponds to independent reels (e.g., a total of 20 reels) that can land a blank symbol, target feature symbol 602 or a dynamic target feature symbol 1106. In other words, each symbol window position in reel area 404 shown in bonus game play UI 1100 transforms into its own reel. Rather than using the same 5×4 reel configuration that produces five independent vertical reels, the bonus game play UI 1100 uses a different reel configuration that produces 20 independent reels to generate a random based game outcome for a game instance in the supplemental game feature.

Figure 12:
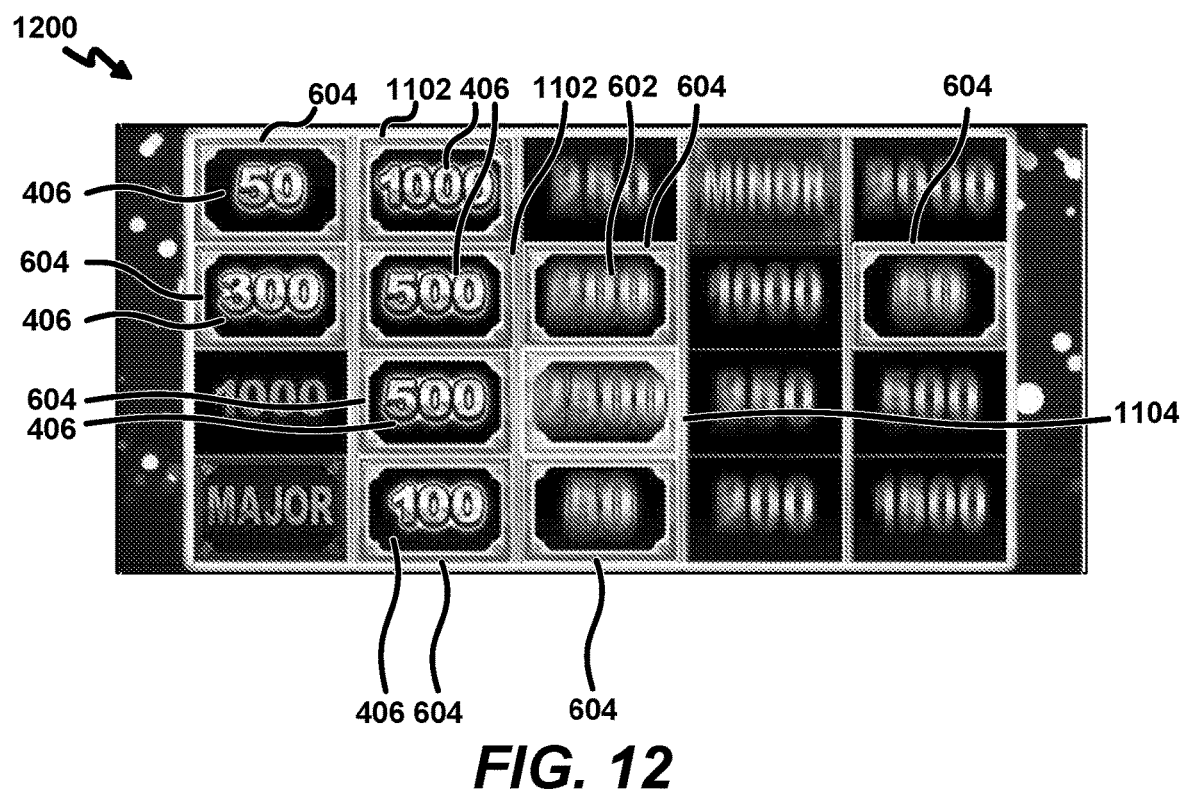
FIG. 12 is an example screenshot of a bonus game play UI that corresponds to a themed version of the bonus game play UI shown in FIG. 6.

FIG. 12 is an example screenshot of a bonus game play UI 1200 that corresponds to a themed version of the bonus game play UI 640 shown in FIG. 6. Bonus game play UI 1200 is shown during the last game instance for a supplemental game feature. Recall that the supplemental game feature could have an initial number of game instances. The bonus game play UI 1200 could show an increase in the number of game instances when dynamic target feature symbol 1106 reveals a re-spin symbol. As the supplemental game feature progresses, the number of remaining game instances left before the supplemental game feature ends decreases. In one example, on the last game instance of the supplemental game feature, the reel area 404 turns back into five independent vertical reels, where the five independent vertical reels include mostly or all credit symbols. Bonus game play UI 640 could also extend the five reels by adding two additional rows within the reel area 404 to create a 5×6 reel configuration. FIG. 12 illustrates a supplemental game feature that maintains 20 independent reels for the last game instance. All reels transform to include credit symbols and/or jackpot prize symbols. At the end of the last game instance, bonus game play UI 1200 generates an animation that illustrates a payout of credit values that land in the feature symbol frames. Credit symbols that land in the upgraded feature symbol frames are multiplied based on the assigned multiplier value.

Figure 13:
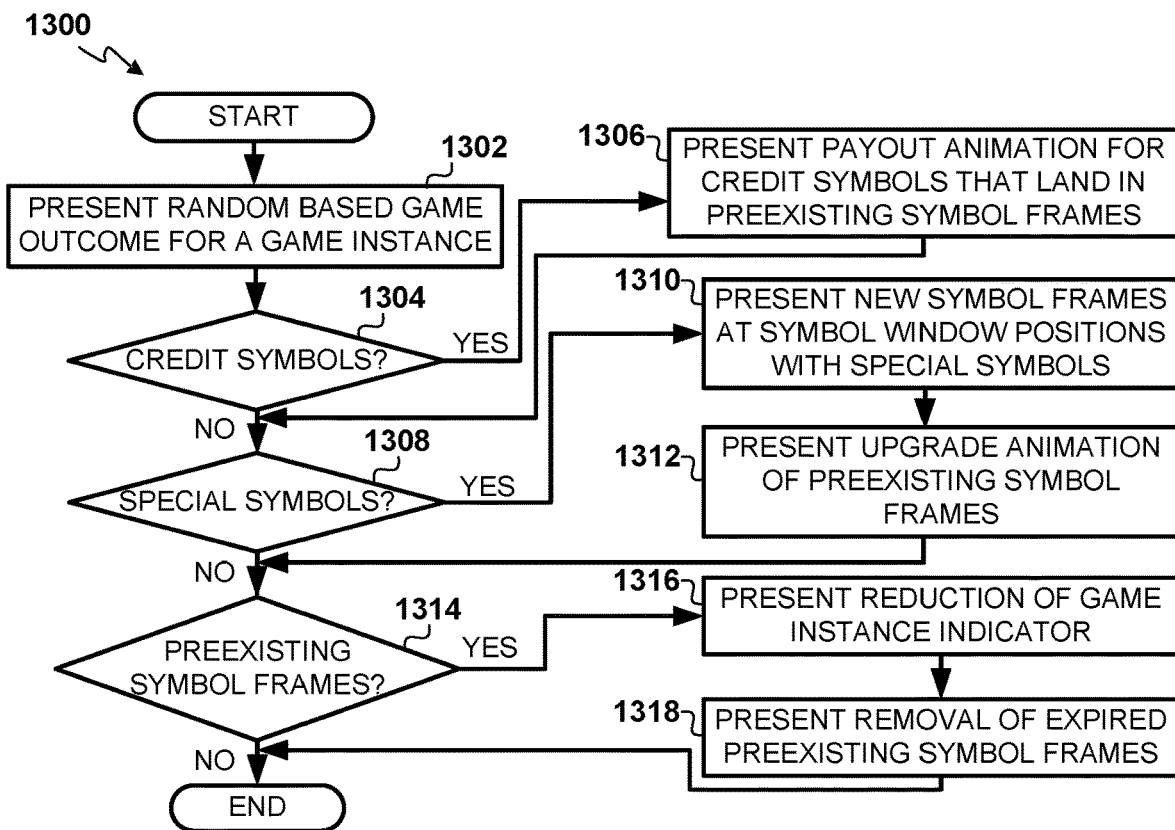
FIG. 13 depicts a flowchart illustrating a UI based operation for presenting a symbol frame mechanic in a base game and/or supplement game feature.

FIG. 13 depicts a flowchart illustrating a UI based operation 1300 for presenting a symbol frame mechanic in a base game and/or supplement game feature. In one implementation, the UI based operation 1300 may be implemented by a UI system 302 shown in FIG. 3 and/or displayed on the primary game display 240 and secondary game display 242 of a gaming device 200 shown in FIG. 2A. The UI based operation 1300 also corresponds to the game play UIs and/or bonus game play UIs shown in FIGS. 4-12. The use and discussion of FIG. 13 is only an example to facilitate explanation and is not intended to limit the disclosure to this specific example. Specifically, UI based operation 1300 does not necessarily need to perform the sequence of blocks in the order as depicted in FIG. 13. As an example, UI based operation 1300 may implement blocks 1304, 1310, and 314 prior to implementing block 1312. Additionally, or alternatively, one or more of the blocks may be optional and may not be performed in all implementations of UI based operation 1300. For example, blocks 1314, 1316, and 1318 may be optional and may not be performed when symbol frames do not expire. In another example, UI based operation 1300 may not perform blocks 1304, 1310, and 1314, but rather a backend-based operation (e.g., backend-based operation 1400 shown in FIG. 14).

UI based operation 1300 may start at block 1302 to present a random based game outcome for a game instance. The game instance may be a game instance in a base game, a tiered, supplemental game feature, or a supplemental game feature. At block 1304, the UI based operation 1300 determines whether a credit symbol lands within a preexisting symbol frame. If UI based operation 1300 determines that a credit symbol lands within a symbol frame, UI based operation 1300 moves to block 1306. Otherwise, UI based operation 1300 moves to block 1308.

At block 1306, UI based operation 1300 presents a payout animation for credit symbols that land in preexisting symbol frames. When a credit symbol lands in a preexisting symbol frame without an assigned multiplier value, UI based operation 1300 presents a payout based on the credit value for the credit symbol. If the symbol frame has been upgraded to another stage associated with a multiplier value, UI based operation 1300 presents a payout based on multiplying the credit value for the credit symbol that lands in the symbol frame with the associated multiplier value. After completing block 1306, UI based operation 1300 may proceed to block 1308.

At block 1308, the UI based operation 1300 determines whether the random based game outcome includes special symbols or any other symbol types (e.g., target feature symbols) that trigger creation and/or upgrades symbol frames. If UI based operation 1300 determines that the random based game outcome includes special symbols, UI based operation 1300 moves to block 1310. Otherwise, UI based operation 1300 moves to block 1314. At block 1310, the UI based operation 1300 presents new symbol frames at symbol window positions with special symbols. The symbol window positions do not have preexisting symbol frames prior to the special symbols landing. When UI based operation 1300 presents a new symbol frame, the UI based operation 1300 may also present a game instance indicator for the symbol frame to indicate the number of game instance left before the symbol frame expires and disappears.

At block 1312, the UI based operation 1300 presents an upgrade animation for special symbols that land at symbol window positions with preexisting symbol frames. The upgrade animation can show an increase in the multiplier value (e.g. ×2, ×3, and ×5) associated with the symbol frame. Additionally, or alternatively, the upgrade animation can show a reset of the game instance indicator back to a designated number of remaining game instances (e.g., three game instances). After completing block 1308, UI based operation 1300 may move to block 1310.

Returning to block 1314, the UI based operation 1300 determines whether there are any preexisting symbol frames that have not been upgraded in block 1312. If there are no preexisting symbol frames that have not been upgraded, UI based operation 1300 ends. Alternatively, if there are preexisting symbol frames that have not been upgraded, UI based operation 1300 moves to block 1316 and presents a reduction of the game instance indicator. As an example, if the game instance indicator is a meter with varying level of fullness, UI based operation 1300 reduces the fullness level of the meter equivalent to one game instance. In another example, if UI based operation 1300 is a counter, UI based operation 1300 reduces the count that tracks the number of game instances left before the preexisting symbol frame expires. At block 1318, UI based operation 1300 presents the removal of expired, preexisting symbol frames. Afterwards, UI based operation 1300 ends.

Figure 14:
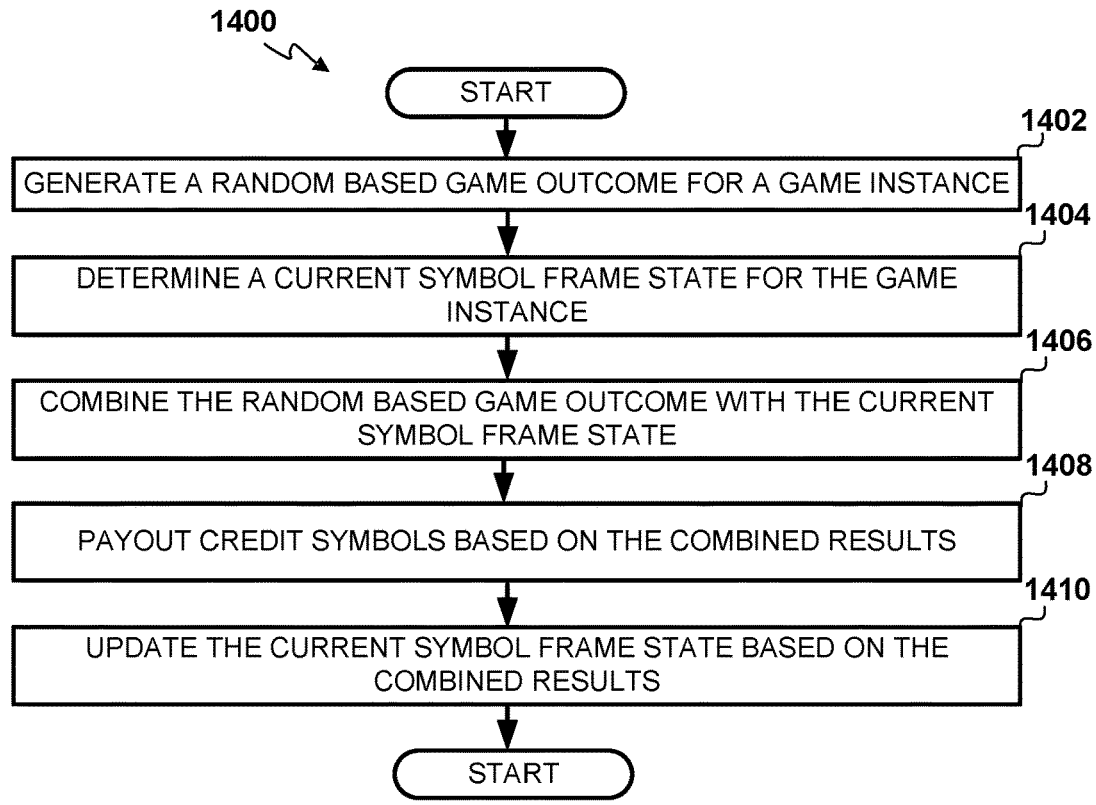
FIG. 14 depicts a flowchart illustrating a backend-based operation for implementing a symbol frame mechanic.

FIGS. 14-17 depicts flowcharts illustrating backend-based operations 1400, 1600, and 1700 for implementing one or more symbol frame mechanics. In one or more implementations, backend-based operations 1400, 1600, and 1700 may be implemented by a game processing backend system 314 shown in FIG. 3 and/or by a game controller 202 shown in FIG. 2A. The use and discussion of FIGS. 14-17 are only examples to facilitate explanation and is not intended to limit the disclosure to this specific example. In particular, backend-based operations 1400, 1600, and 1700 do not necessarily need to perform the sequence of blocks in the order as depicted in FIG. 14. For example, backend-based operation 1400 may implement block 1404 prior to implementing block 1402. Additionally, or alternatively, one or more of the blocks may be optional and may not be performed in all implementations of backend-based operations 1400, 1600, and 1700. Using FIG. 14 as an example, block 1408 may be optional if the random based game outcome does not generate a credit symbol.

In FIG. 14, backend-based operation 1400 implements a symbol frame mechanic presented by UI based operation 1300 shown in FIG. 13. Backend-based operation 1400 may start at block 1402 to generate a random based game outcome for a game instance. With reference to FIG. 3, in a slot game context, to determine the results for one or more reels, the backend-based operation 1400 performs one or more RNG pulls on lookup tables depending on the number of reels. Afterwards, backend-based operation 1400 moves to block 1404 and determines a current symbol frame state for the game instance. In one example, backend-based operation 1400 could determine the current symbol frame state by accessing the appropriate symbol frame state configuration. Referring back to FIG. 3, the symbol frame state configuration 324 stores a variety of game parameters relevant to tracking the current symbol frame state in a game instance. From the symbol frame state configuration 324, backend-based operation 1400 can determine which symbol window positions have symbol frames and the relevant stage information for each symbol frame.

From block 1404, the backend-based operation 1400 then moves to block 1406 and combines the random based game outcome the current symbol frame state. In other words, the backend-based operation 1400 maps and/or matches symbol frame information for the current symbol frame state to the random based game outcome. As an example, backend-based operation 1400 maps the symbol frame information for symbol window positions on reel 1 with the symbols that land on the random based game outcome. By doing so, the backend-based operation 1400 can generate results relevant for determining payout information and/or perform updates to the current symbol frame state. Specially, at block 1408, backend-based operation 1400 performs payout of credit symbol based on the combined results. At block 1410, the backend-based operation 1400 updates the current symbol frame state based the combined results.

Figure 15:
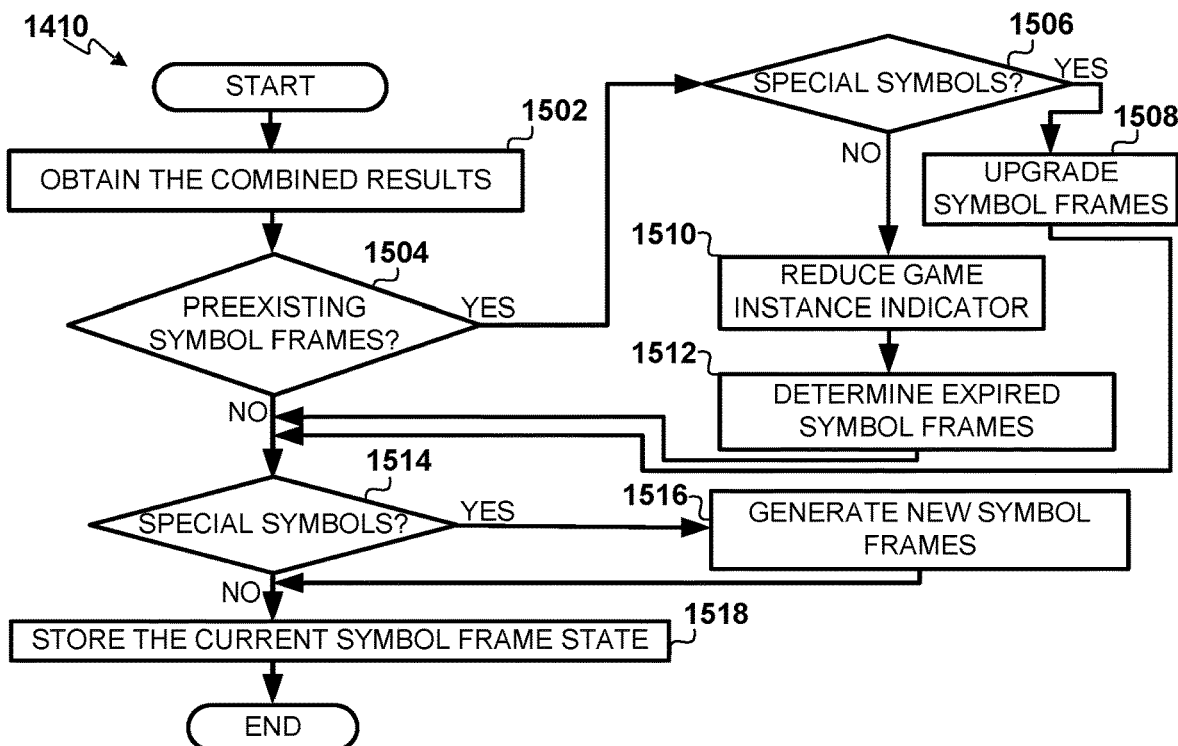
FIG. 15 depicts a flowchart illustrating another backend-based operation for implementing a symbol frame mechanic.

FIG. 15 depicts a flowchart illustrating an implementation of block 1410 shown in FIG. 14. In one or more implementations, prior to updating the current symbol frame state and after generating a random based game outcome for a game instance, backend-based operation 1400 determines whether there are preexisting symbol frames that have not been upgraded. For preexisting symbol frames that have not been upgraded, backend-based operation 1400 reduces the count for tracking the number of remaining game instances left before a symbol frame expires. For preexisting symbol frames that are upgraded, the backend-based operation 1400 does not reduce the count since the count has been reset to a designated number of remaining game instances. For any special symbols that land in symbol window positions without preexisting symbol frames, backend-based operation 1400 generates new symbol frames that have a designated number of remaining game instances. The designated number of game instances remaining for new symbol frames and upgraded, preexisting symbol frames could be set to be the same or different numbers.

As shown in FIG. 15, to perform block 1410, backend-based operation 1400 starts at block 1502 to obtain the combined results generated at block 1406. Afterwards, backend-based operation 1400 moves to block 1504 and determines whether there are preexisting symbol frames in the current symbol frame state. If backend-based operation 1400 determines there are preexisting symbol frames, backend-based operation 1400 moves to block 1506 to determine whether any special symbols land in the preexisting symbol frames. Otherwise, backend-based operation 1400 moves to block 1514. At block 1506, if backend-based operation 1400 determines that special symbols or other symbol types that generate symbol frames land in the preexisting symbol frames, backend-based operation 1400 continues to block 1508 and upgrades the preexisting symbol frames. Alternatively, backend-based operation 1400 moves to block 1510 and reduces the count for the game instance indicator.

From block 1510, backend-based operation 1400 moves to block 1512 to determine whether any of the preexisting symbol frames have expired after reducing the count for the game instance indicator. From block 1508 and 1512, backend-based operation 1400 moves to block 1514. At block 1514, backend-based operation 1400 determines whether special symbols land in symbol window positions that do not have preexisting symbol frames. If there are symbol frames that land, backend-based operation 1400 moves to block 1516 and generates new symbol frames. From block 1516, backend-based operation 1400 moves to block 1518 and stores the updates as the current symbol frame state.

Figure 16:
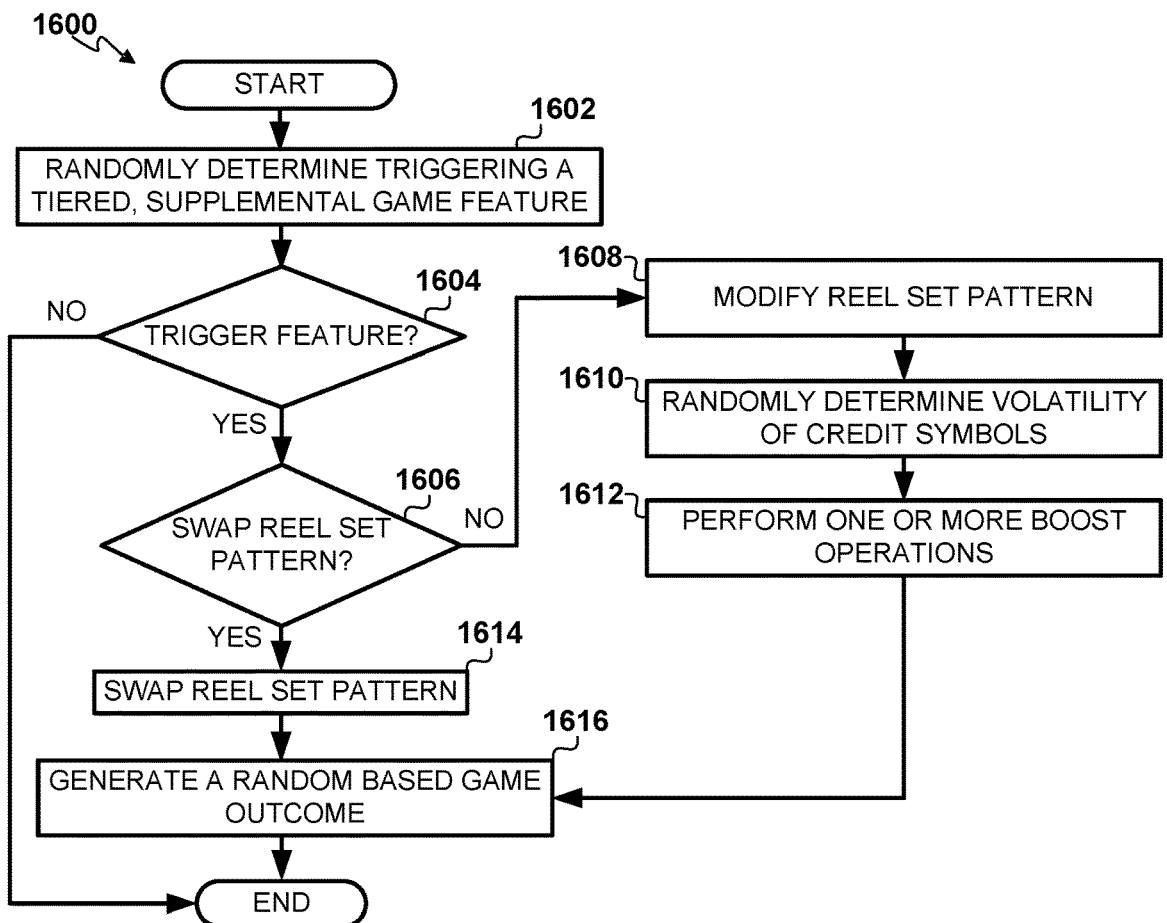
FIG. 16 depicts a flowchart illustrating another backend-based operation for implementing a symbol frame mechanic.

In FIG. 16, backend-based operation 1600 implements a symbol frame mechanic that utilizes a tiered, supplemental game feature. Backend-based operation 1600 starts at block 1602 and randomly determines triggering a tiered, supplemental game feature. To randomly trigger one of the tiered, supplemental game features, the backend-based operation 1600 performs an RNG pull from a lookup table 322 that is separate and independent from the RNG pulls for determining the random based game outcome in the base game. The lookup table 322 maps the RNG outcome to which tiered, supplemental game feature should be triggered. Table 2, which was previously disclosed, provides an example lookup table for randomly determining whether to trigger one of the tiered, supplemental game features.

At block 1604, backend-based operation 1600 determines whether a tiered, supplemental game feature should be triggered. If no tiered, supplemental game feature should be triggered, backend-based operation 1600 ends. Otherwise, backend-based operation 1600 moves to block 1606. At block 1606, backend-based operation 1600 randomly determines whether to swap a reel set pattern for one or more reel strips. Table 4, which was previously shown is an example of a lookup table the backend-based operation 1600 uses to randomly determine whether to swap out or modify the reel set pattern in the base game. If backend-based operation 1600 determines not to swap out the reel set pattern for the one or more reel strips, backend-based operation 1600 moves to block 1608. Otherwise, backend-based operation 1600 proceeds to block 1614.

At block 1608, backend-based operation 1600 modifies reel set patterns for the reel strips. Specifically, the backend-based operation 1600 transforms one or more symbol types to a special symbol type, credit symbol type, and/or jackpot symbol type. In one or more implementations, the backend-based operation 1600 create reel strips that have a specific ratio of special symbols to credit and/or other symbol types (e.g., 1:4, 1:5, 1:6). By doing so, the backend-based operation 1600 potentially increases the number of symbol frames created and/or upgraded in the tiered, supplemental game feature and/or the payout amount. Afterwards, backend-based operation 1600 moves to block 1610.

At block 1610, backend-based operation 1600 can randomly determine volatility of the credit symbols. In one or more implementations, backend-based operation 1600 may dynamically populate the credit values for one or more credit symbols by randomly selecting a volatility level. As an example, for a given spin, each reel strip in a set of reels (e.g., reels 1-5) could include one or more credit symbols that backend-based operation 1600 dynamically determines their corresponding credit values. To dynamically determine the credit values for each credit symbol, backend-based operation 1600 initiates an RNG call for each credit symbol to pull from a volatility lookup table. The volatility lookup table maps the RNG outcome to a certain volatility level, such as low volatility, medium volatility, or high volatility. Based on the assigned volatility, the game processing pipeline 300 populates a credit value for a credit symbol.

At block 1612, for certain tiered, supplemental game features, backend-based operation 1600 may perform one or more boost operations to increase the populated credit value. Recall that tiered, supplemental game features may have varying volatility and/or average payout by performing a boost operation that randomly boosts each credit value for a credit symbol. As an example, a starting tier, supplemental game feature may not perform a boost operation while a second tier, supplemental game feature performs one boost operation and a third tier, supplemental game feature performs two boost operation. For a given boost operation, backend-based operation 1600 performs an RNG pull for each credit symbol to determine a boost value. The RNG pull from one or more lookup table maps the RNG outcome to a boost value. Table 3 is an example of a lookup table. The boost value represents a certain increase in the credit value. For example, the boost value could represent a multiplier value or value used to determine a multiplier value. In another example, the boost value represents how many levels to move up in a volatility lookup table to determine the boosted credit value. Afterwards, backend-based operation 1600 moves to block 1616 and generates a random based game outcome.

Returning to block 1614, backend-based operation 1600 swaps out the reel set pattern. By swapping out reel set patterns, the backend-based operation 1600 can potentially increases the number of symbol frames created and/or upgraded in the tiered, supplemental game feature. As an example, to increase the number of created symbol frames and/or upgraded preexisting symbol frames in the tiered, supplemental game feature, the new reel set pattern could include one or more reel strips with mostly or all special symbols. Other examples could use a reel set pattern that includes mostly or all credit symbols or varying ratios of special symbols to credit symbols (e.g., 1:1 or 1:2). Afterwards, backend-based operation 1600 moves to block 1616 and generates a random based game outcome.

Figure 17:
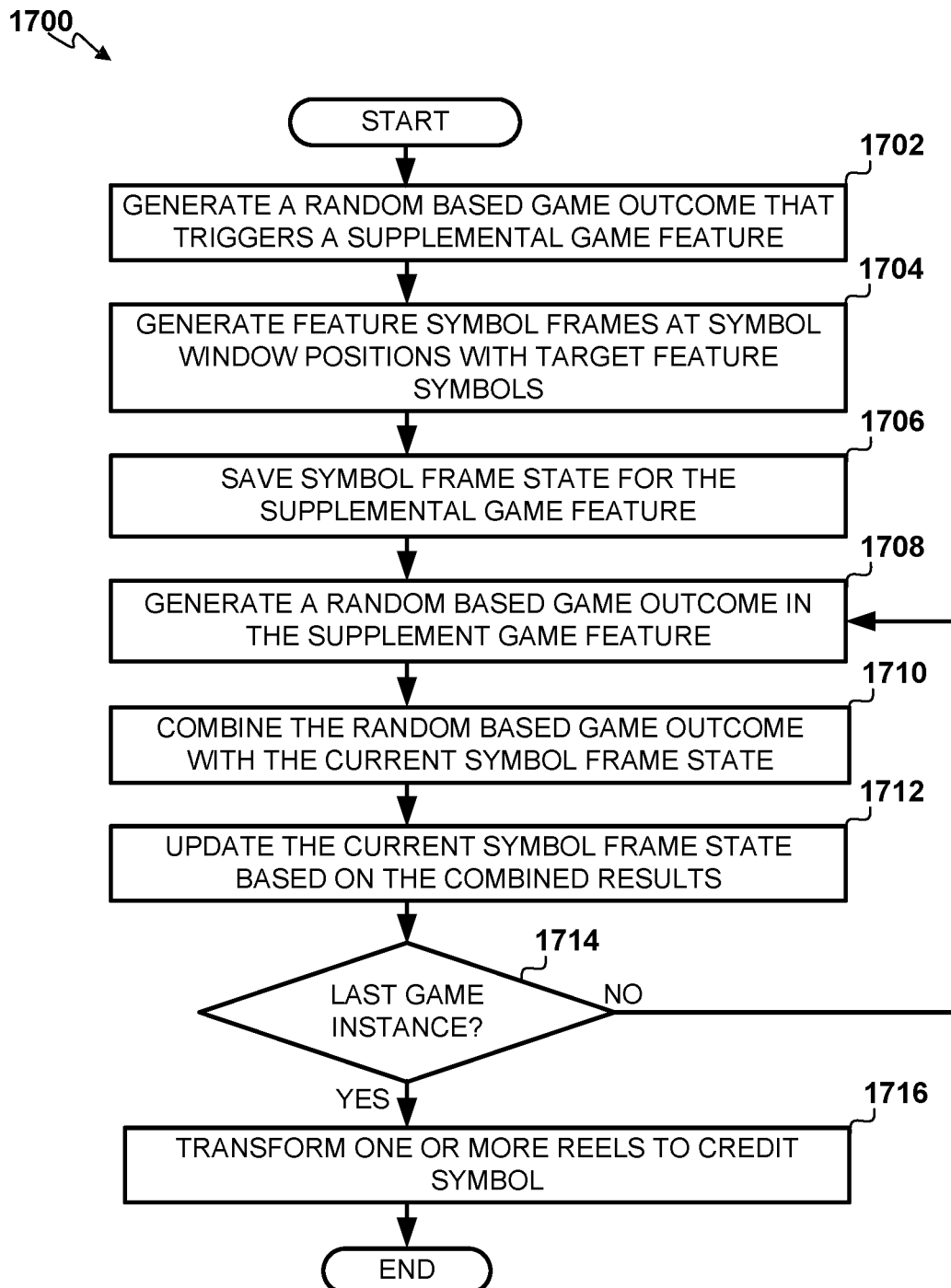
FIG. 17 depicts a flowchart illustrating another backend-based operation for implementing a symbol frame mechanic.

In FIG. 17, backend-based operation 1700 implements a symbol frame mechanic that utilizes a target feature symbols to generate feature symbol frames. At block 1702, backend-based operation 1700 generates a random based game outcome that satisfies a trigger condition for a supplemental game feature. As an example, for a given game instance, the backend-based operation 1700 generates a random based game outcome that lands a number of target feature symbols that exceeds a trigger count (e.g., six or more target feature symbols land in a reel grid for a given game instance). From block 1702, backend-based operation 1700 moves to block 1704 and generate feature symbol frames at symbol window positions with target feature symbols. Afterwards, backend-based operation 1700 moves to block 1706 and saves the symbol frame state for the supplemental game feature. In other words, the symbol frame state saved at block 1706 represents the initial symbol frame state when entering the supplemental game feature.

At block 1708, the backend-based operation 1700 generates a random based game outcome in the supplement game feature. During the supplemental game feature, the backend-based operation 1700 could generate a random based game outcome that produces one or more feature symbol frames. To produce feature symbol frames in the supplemental game feature, the backend-based operation 1700 could land target feature symbols. In one or more implementations, the backend-based operation 1700 could also generate a dynamic target feature symbol that produces feature symbol frames. In addition to producing feature symbol frames, the backend-based operation 1700 changes the dynamic target feature symbol into another symbol type by performing a separate RNG pull to map an RNG outcome to other symbol types. Examples of other symbol types include a re-spin symbol (e.g., +1 spin symbol), a double upgrade symbol that performs two upgrades on a feature symbol frame, and a variety of jackpot prize symbols, such as mini jackpot symbol, a minor jackpot symbol, a major jackpot symbol, and a grand jackpot symbol. The backend-based operation 1700 could also configure the dynamic target feature symbol and/or dynamic special symbol to be interactive where player input (e.g., touches a touchscreen) triggers the dynamic target feature symbol to reveal the new symbol type.

At block 1710, backend-based operation 1700 combine the random based game outcome with the current symbol frame state. Block 1710 is similar to block 1406 shown in FIG. 14. From block 1710, backend-based operation 1700 then moves to block 1712 and updates the current frame state based on the combined results. Updating the current symbol frame state is similar to block 1410 shown in FIGS. 14 and 15 except that backend-based operation 1700 does not perform operations relating to determining whether a feature symbol frame expires. Recall that feature symbol frames do not expire and remain until the supplement game feature ends. If a target feature symbol lands in a symbol window position without a symbol frame, the backend-based operation 1700 creates a feature symbol frame at the corresponding symbol window position. If a target feature symbol lands within a feature symbol frame, the backend-based operation 1700 upgrades the feature symbol frame to a different stage by displaying a multiplier value (e.g., ×2 and ×5) with the symbol frame.

At block 1714, backend-based operation 1700 performs a check on whether the current game instance is the last game instance of the supplemental game feature. If the backend-based operation 1700 determines that the current game instance is not the last game instance, backend-based operation 1700 moves to block 1708. Otherwise, backend-based operation 1700 ends.

Alternatives and Variations

Numerous embodiments are described in this disclosure and are presented for illustrative purposes only. The described embodiments are not, and are not intended to be, limiting in any sense. As an example, although the disclosure generally describes the symbol frame mechanics in a Class III reel or slot game context the disclosure is not limited to this type of game and/or gaming device. For example, other implementations and/or portions of the symbol frame mechanics may be implemented as a Class II gaming device. In particular, a gaming device may present game play UIs and bonus game UIs while implementing a Class II bingo game. Additionally, or alternatively, portions of the symbol frame mechanics can be utilized for other types of wagering game, such as keno, lottery, and pachinko.

The present disclosure is widely applicable to numerous embodiments, as is readily apparent from the disclosure. One of ordinary skill in the art will recognize that the innovations described herein may be practiced with various modifications and alterations, such as structural, logical, software, and electrical modifications. Although particular features of the innovations described herein may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the innovations described herein that must be present in all embodiments.

The Title (set forth at the beginning of the first page of this disclosure) is not to be taken as limiting in any way as the scope of the disclosed embodiments. Headings of sections provided in this disclosure are for convenience only and are not to be taken as limiting the disclosure in any way.

When an ordinal number (such as "first," "second," "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget." Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When introducing elements of aspects of the present disclosure or embodiments thereof, the articles "a," "an," "the," and "said" are intended to mean that there are one or more of the elements. The terms "comprising," including," and "having" are intended to be inclusive and mean that there may be additional elements other than the listed elements.

When a single device, component, structure, or article is described herein, more than one device, component, structure or article (whether or not they cooperate) may alternatively be used in place of the single device, component or article that is described. Accordingly, the functionality that is described as being possessed by a device may alternatively be possessed by more than one device, component or article (whether or not they cooperate).

Similarly, where more than one device, component, structure, or article is described herein (whether or not they cooperate), a single device, component, structure, or article may alternatively be used in place of the more than one device, component, structure, or article that is described. For example, a plurality of computer-based devices may be substituted with a single computer-based device. Accordingly, the various functionality that is described as being possessed by more than one device, component, structure, or article may alternatively be possessed by a single device, component, structure, or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Further, the systems and methods described herein are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

Devices that are in communication with each other need not be in continuous communication with each other, unless expressly specified otherwise. On the contrary, such devices need only transmit to each other as necessary or desirable and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the innovations described herein. Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the innovations described herein, and does not imply that the illustrated process is preferred.

Although a process may be described as including a plurality of steps, that does not indicate that all or even any of the steps are essential or required. Various other embodiments within the scope of the present disclosure include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the present disclosure include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise.

For the sake of presentation, the detailed description uses terms like "determine" and "select" to describe computer operations in a computer system. These terms denote operations performed by a computer and should not be confused with acts performed by a human being. The actual computer operations corresponding to these terms vary depending on implementation. For example, "determining" something can be performed in a variety of manners, and therefore the term "determining" (and like terms) can indicate calculating, computing, deriving, looking up (e.g., in a table, database or data structure), ascertaining, recognizing, and the like.

As used herein, the term "send" denotes any way of conveying information from one component to another component, and the term "receive" denotes any way of getting information at one component from another component. The two components can be part of the same computer system or different computer systems. The information can be passed by value (e.g., as a parameter of a message or function call) or passed by reference (e.g., in a buffer). Depending on context, the information can be communicated directly between the two components or be conveyed through one or more intermediate components. As used herein, the term "connected" denotes an operable communication link between two components, which can be part of the same computer system or different computer systems. The operable communication link can be a wired or wireless network connection, which can be direct or pass through one or more intermediate components (e.g., of a network). Communication among computers and devices may be encrypted to ensure privacy and prevent fraud in any of a variety of ways well known in the art.

It will be readily apparent that the various methods and algorithms described herein may be implemented by, e.g., appropriately programmed general-purpose computers and computing devices. Typically, a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium for performing the process. The apparatus that performs the process can include components and devices (e.g., a processor, input and output devices) appropriate to perform the process. A computer-readable medium can store program elements appropriate to perform the method.

The term "computer-readable medium" refers to any non-transitory storage or memory that may store computer-executable instructions or other data in a computer system and be read by a processor in the computer system. A computer-readable medium may take many forms, including but not limited to non-volatile storage or memory (such as optical or magnetic disk media, a solid-state drive, a flash drive, PROM, EPROM, and other persistent memory) and volatile memory (such as DRAM). The term "computer-readable media" excludes signals, waves, and wave forms or other intangible or transitory media that may nevertheless be readable by a computer.

The present disclosure provides, to one of ordinary skill in the art, an enabling description of several embodiments and/or innovations. Some of these embodiments and/or innovations may not be claimed in the present application but may nevertheless be claimed in one or more continuing applications that claim the benefit of priority of the present application. Applicants may file additional applications to pursue patents for subject matter that has been disclosed and enabled but not claimed in the present application.

The foregoing description discloses only exemplary embodiments of the present disclosure. Modifications of the above disclosed apparatus and methods which fall within the scope of the present disclosure will be readily apparent to those of ordinary skill in the art. For example, although the examples discussed above are illustrated for a gaming market, embodiments of the present disclosure can be implemented for other markets. The gaming system environment of the examples is not intended to suggest any limitation as to the scope of use or functionality of any aspect of the disclosure.

While the invention has been described with respect to the figures, it will be appreciated that many modifications and changes may be made by those skilled in the art without departing from the spirit of the invention. Any variation and derivation from the above description and figures are included in the scope of the present invention as defined by the claims. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

What is claimed is:

1. A non-transitory computer-readable medium, readable by at least one processor and comprising instructions stored thereon to cause the at least one processor to:
   determine that a random-based game outcome based on a random number generator in a game instance of a base game triggers a supplemental game feature, wherein the random-based game outcome includes a plurality of target feature symbols from a first set of one or more target feature symbols;
   cause, as part of the supplemental game feature, a plurality of feature symbol frames to be generated for symbol window positions having the target feature symbols from the first set of one or more target feature symbols, wherein the target feature symbols from the first set of one or more target feature symbols trigger generation of the feature symbol frames and each feature symbol frame is associated with a corresponding multiplier value;
   generate, based on the random number generator, a random-based feature game outcome in a game instance of the supplemental game feature;
   increase the corresponding multiplier value for each feature symbol frame associated with a symbol window position in which the random-based feature game outcome causes a target feature symbol from a second set of one or more target feature symbols to be displayed; and
   cause a payout to be awarded when a credit symbol is displayed in a symbol window position associated with one of the feature symbol frames as part of the random-based feature game outcome, wherein the payout is based on an amount associated with the credit symbol and the multiplier value associated with the feature symbol frame associated with the symbol window position in which the credit symbol is displayed.

2. The non-transitory computer-readable medium of claim 1, wherein the feature symbol frames are symbol frames that last until the end of the supplemental game feature.

3. The non-transitory computer-readable medium of claim 1, wherein the instructions further cause the at least one processor to store a current symbol frame state within a symbol frame state configuration, wherein the symbol frame state configuration includes data that tracks the symbol window positions and multiplier value for each feature symbol frame.

4. The non-transitory computer-readable medium of claim 3, wherein a second symbol frame state configuration is allocated to store current symbol frame state for a base game, and wherein the second symbol frame state configuration is different from the symbol frame state configuration.

5. The non-transitory computer-readable medium of claim 1, wherein the random-based game outcome in the game instance of the supplemental game feature includes a second set of target feature symbols.

6. The non-transitory computer-readable medium of claim 5, wherein the instructions further cause the at least one processor to:
   determine whether any target feature symbols from the second set of one or more target feature symbols land in symbol window positions not associated with feature symbol frames; and
   cause feature symbol frames associated with the symbol window positions that are not associated with feature symbol frames to be generated.

7. The non-transitory computer-readable medium of claim 1, wherein the instructions further cause the at least one processor to cause each symbol window position to transform into an independent reel after triggering the supplemental game feature.

8. The non-transitory computer-readable medium of claim 1, wherein the second set of one or more target feature symbols includes a dynamic target feature symbol that transforms into a different symbol type after landing in a symbol window position.

9. The non-transitory computer-readable medium of claim 8, wherein the different symbol type is a re-spin symbol type.

10. The non-transitory computer-readable medium of claim 8, wherein the different symbol type is a jackpot symbol type.

11. The non-transitory computer-readable medium of claim 8, wherein the instructions further cause the at least one processor to:
   determine whether the dynamic target feature symbol lands in a symbol window position not associated with a feature symbol frame; and
   cause a corresponding feature symbol frame to be associated with the symbol window position in which the dynamic feature symbol landed.

12. The non-transitory computer-readable medium of claim 8, wherein the instructions further cause the at least one processor to:
   determine whether the dynamic feature symbol lands within one of the feature symbol frames; and
   cause the feature symbol frame within which the dynamic feature symbol landed to be upgraded.

13. The non-transitory computer-readable medium of claim 12, wherein the feature symbol frames are associated with one or more stage levels, and wherein upgrading the feature symbol frame increases the stage level for the upgraded feature symbol frame.

14. The non-transitory computer-readable medium of claim 1, wherein the base game includes one or more symbol frames that expire.

15. The non-transitory computer-readable medium of claim 14, wherein the symbol frames that expire do not persist into the supplemental game feature.

16. A non-transitory computer-readable medium, readable by at least one processor and comprising instructions stored thereon to cause the at least one processor to:
- determine that a random-based game outcome based on a random number generator in a game instance of a base game triggers a supplemental game feature, wherein the random-based game outcome includes a plurality of target feature symbols from a first set of one or more target feature symbols;
- cause each symbol window position to transform into an independent reel after triggering the supplemental game feature;
- cause, as part of the supplemental game feature, a plurality of feature symbol frames to be generated for symbol window positions having the target feature symbols from the first set of one or more target feature symbols, wherein the target feature symbols from the first set of one or more target feature symbols trigger generation of the feature symbol frames;
- determine a current symbol frame state according to the feature symbol frames;
- generate, based on the random number generator, a random-based feature game outcome in a game instance of the supplemental game feature;
- combine the random based game outcome in the game instance of the supplemental game feature with the current symbol frame state; and
- update the current symbol frame state based on combining the random based game outcome in the game instance of the supplemental game feature with the current symbol frame state.

17. The non-transitory computer-readable medium of claim 16, wherein the instructions further cause the at least one processor to:
- cause the independent reels to transform into a plurality of vertical reels with a plurality of credit symbols; and
- cause, based on the random number generator, a random-based game outcome for a second game instance in the supplemental game feature with the vertical reels to be generated.

18. The non-transitory computer-readable medium of claim 17, wherein the second game instance is a last game instance in the supplemental game feature.

19. The non-transitory computer-readable medium of claim 18, wherein the instructions further cause the at least one processor to cause game play to return to the base game after completing the last game instance, wherein the base game does not include the feature symbol frames.

* * * * *